United States Patent
Li et al.

(10) Patent No.: US 12,516,830 B1
(45) Date of Patent: Jan. 6, 2026

(54) THERMAL MANAGEMENT SYSTEM FOR STRUCTURES

(71) Applicants: Jiayu Li, West Boylston, MA (US); Xiaocheng Zou, West Boylston, MA (US)

(72) Inventors: Jiayu Li, West Boylston, MA (US); Xiaocheng Zou, West Boylston, MA (US)

(*) Notice: Subject to any disclaimer, the term of this patent is extended or adjusted under 35 U.S.C. 154(b) by 0 days.

(21) Appl. No.: 18/888,160

(22) Filed: Sep. 18, 2024

(51) Int. Cl.
*F24F 5/00* (2006.01)
*F24F 13/30* (2006.01)
*F25B 9/00* (2006.01)

(52) U.S. Cl.
CPC .......... *F24F 5/0089* (2013.01); *F24F 13/30* (2013.01); *F25B 9/008* (2013.01); *F25B 2339/00* (2013.01); *F25B 2600/11* (2013.01)

(58) Field of Classification Search
CPC .. F25B 9/008; F25B 2339/00; F25B 2600/11; F25B 2600/111; F25B 2600/112; F24F 5/0089; F24F 13/30
See application file for complete search history.

(56) References Cited

U.S. PATENT DOCUMENTS

| | | | | |
|---|---|---|---|---|
| 5,144,812 A | * | 9/1992 | Mills, Jr. | F24F 11/77 62/186 |
| 6,254,930 B1 | * | 7/2001 | Kreiselmaier | F28F 19/04 165/110 |
| 10,443,900 B2 | * | 10/2019 | Kujak | F25B 9/008 |
| 11,022,372 B2 | * | 6/2021 | Tada | F25B 39/00 |
| 11,592,193 B2 | * | 2/2023 | Onaka | F25B 9/008 |
| 2010/0192623 A1 | * | 8/2010 | Cittadini | F25B 39/00 62/498 |

FOREIGN PATENT DOCUMENTS

| | | | |
|---|---|---|---|
| CN | 204574623 U | * | 8/2015 |
| CN | 206430607 U | * | 8/2017 |
| CN | 108758781 A | * | 11/2018 |

\* cited by examiner

*Primary Examiner* — Tavia Sullens
(74) *Attorney, Agent, or Firm* — Dhiraj Jindal; PATENT YOGI LLC

(57) ABSTRACT

A thermal management system includes an exterior heat exchange unit disposed exterior to a structure, an interior heat exchange unit disposed in an interior of the structure, a flow switching device fluidly coupled with the exterior heat exchange unit and the interior heat exchange unit, and a compressor unit fluidly coupled with the flow switching device. The flow switching device switches a direction of flow of a working fluid between a first direction of flow and a second direction of flow. The compressor unit circulates the working fluid between the exterior heat exchange unit and the interior heat exchange unit based on the direction of flow. The exterior heat exchange unit absorbs heat and the interior heat exchange unit discharges the heat in the first flow direction. The exterior heat exchange unit discharges the heat and the interior heat exchange unit absorbs the heat in the second flow direction.

17 Claims, 14 Drawing Sheets

THERMAL MANAGEMENT SYSTEM FOR STRUCTURES

FIELD OF THE INVENTION

Generally, the present disclosure relates to the field of heat exchange. More specifically, the present disclosure relates to a thermal management system for structures.

BACKGROUND OF THE INVENTION

Traditional heating and cooling systems for buildings often rely on separate mechanisms for heating and cooling, leading to inefficiencies and higher costs. Existing solutions typically use large duct systems, which can be noisy, bulky, and difficult to install in existing buildings.

Therefore, there is a need for a more integrated and efficient thermal management system for structures that can provide both heating and cooling using the same infrastructure that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a thermal management system for structures, in accordance with some embodiments. Accordingly, the thermal management system may include at least one exterior heat exchange unit, at least one interior heat exchange unit, at least one flow switching device, and at least one compressor unit. Further, the at least one exterior heat exchange unit may be configured to be disposed exterior to at least one structure. Further, the at least one interior heat exchange unit may be configured to be disposed in an interior of the at least one structure. Further, the at least one flow switching device may be fluidly coupled with the at least one exterior heat exchange unit and the at least one interior heat exchange unit. Further, the at least one flow switching device may be configured for switching a direction of flow of a working fluid between a first direction of flow and a second direction of flow. Further, the first direction of flow may be opposite to the second direction of flow. Further, the working fluid flows between the at least one exterior heat exchange unit and the at least one interior heat exchange unit. Further, the at least one compressor unit may be fluidly coupled with the at least one flow switching device. Further, the at least one compressor unit may be configured for circulating the working fluid between the at least one exterior heat exchange unit and the at least one interior heat exchange unit based on the direction of flow. Further, the circulating may include drawing the working fluid in a first state and discharging the working fluid in a second state after compressing the working fluid. Further, the working fluid in the first state may be drawn from the at least one exterior heat exchange unit and the working fluid in the second state may be discharged to the at least one interior heat exchange unit in the first direction of flow. Further, the working fluid in the first state may be drawn from the at least one interior heat exchange unit and the working fluid in the second state may be discharged to the at least one exterior heat exchange unit in the second direction of flow. Further, the at least one exterior heat exchange unit may be configured for absorbing heat from the exterior of the at least one structure in the first flow direction based on the circulating of the working fluid. Further, the at least one interior heat exchange unit may be configured for discharging the heat to the interior of the at least one structure in the first flow direction based on the circulating of the working fluid. Further, the at least one exterior heat exchange unit may be configured for discharging the heat to the exterior of the at least one structure in the second flow direction based on the circulating of the working fluid. Further, the at least one interior heat exchange unit may be configured for absorbing the heat from the interior of the at least one structure in the second flow direction based on the circulating of the working fluid.

Further disclosed herein is a thermal management system for structures, in accordance with some embodiments. Accordingly, the thermal management system may include at least one exterior heat exchange unit, at least one interior heat exchange unit, at least one flow switching device, and at least one compressor unit. Further, the at least one exterior heat exchange unit may be configured to be disposed exterior to at least one structure. Further, the at least one interior heat exchange unit may be configured to be disposed in an interior of the at least one structure. Further, the at least one flow switching device may be fluidly coupled with the at least one exterior heat exchange unit and the at least one interior heat exchange unit. Further, the at least one flow switching device may be configured for switching a direction of flow of a working fluid between a first direction of flow and a second direction of flow. Further, the first direction of flow may be opposite to the second direction of flow. Further, the working fluid flows between the at least one exterior heat exchange unit and the at least one interior heat exchange unit. Further, the at least one compressor unit may be fluidly coupled with the at least one flow switching device. Further, the at least one compressor unit may be configured for circulating the working fluid between the at least one exterior heat exchange unit and the at least one interior heat exchange unit based on the direction of flow. Further, the circulating may include drawing the working fluid in a first state and discharging the working fluid in a second state after compressing the working fluid. Further, the working fluid in the first state may be drawn from the at least one exterior heat exchange unit and the working fluid in the second state may be discharged to the at least one interior heat exchange unit in the first direction of flow. Further, the working fluid in the first state may be drawn from the at least one interior heat exchange unit and the working fluid in the second state may be discharged to the at least one exterior heat exchange unit in the second direction of flow. Further, the at least one exterior heat exchange unit may be configured for absorbing heat from the exterior of the at least one structure in the first flow direction based on the circulating of the working fluid. Further, the at least one interior heat exchange unit may be configured for discharging the heat to the interior of the at least one structure in the first flow direction based on the circulating of the working fluid. Further, the at least one exterior heat exchange unit may be configured for discharging the heat to the exterior of the at least one structure in the second flow direction based on the circulating of the working fluid. Further, the at least one interior heat exchange unit may be configured for absorbing the heat from the interior of the at least one structure in the second flow direction based on the circulating of the working fluid. Further, the at least one exterior heat exchange unit may include a first exterior port and a second exterior port. Further, the at least one interior heat exchange unit may include a first interior port and a second interior port. Further, the at least one compressor unit may include an inlet port and an outlet port. Further, the at least one flow switching device may include a first device port, a second device port, a third device port, and a fourth device port. Further, the outlet port may be fluidly coupled with the first device port using at least one first coupling element. Further, the second device port may be fluidly coupled with the first exterior port using at least one second coupling element. Further, the second exterior port may be fluidly coupled with the second interior port using at least one third coupling element. Further, the first interior port may be fluidly coupled with the fourth device port using at least one fourth coupling element. Further, the third device port may be fluidly coupled with the inlet port using at least one fifth coupling element.

Further disclosed herein is a thermal management system for structures, in accordance with some embodiments. Accordingly, the thermal management system may include at least one exterior heat exchange unit, at least one interior heat exchange unit, at least one flow switching device, and at least one compressor unit. Further, the at least one exterior heat exchange unit may be configured to be disposed exterior to at least one structure. Further, the at least one interior heat exchange unit may be configured to be disposed in an interior of the at least one structure. Further, the at least one flow switching device may be fluidly coupled with the at least one exterior heat exchange unit and the at least one interior heat exchange unit. Further, the at least one flow switching device may be configured for switching a direction of flow of a working fluid between a first direction of flow and a second direction of flow. Further, the first direction of flow may be opposite to the second direction of flow. Further, the working fluid flows between the at least one exterior heat exchange unit and the at least one interior heat exchange unit. Further, the at least one compressor unit may be fluidly coupled with the at least one flow switching device. Further, the at least one compressor unit may be configured for circulating the working fluid between the at least one exterior heat exchange unit and the at least one interior heat exchange unit based on the direction of flow. Further, the circulating may include drawing the working fluid in a first state and discharging the working fluid in a second state after compressing the working fluid. Further, the working fluid in the first state may be drawn from the at least one exterior heat exchange unit and the working fluid in the second state may be discharged to the at least one interior heat exchange unit in the first direction of flow. Further, the working fluid in the first state may be drawn from the at least one interior heat exchange unit and the working fluid in the second state may be discharged to the at least one exterior heat exchange unit in the second direction of flow. Further, the at least one exterior heat exchange unit may be configured for absorbing heat from the exterior of the at least one structure in the first flow direction based on the circulating of the working fluid. Further, the at least one interior heat exchange unit may be configured for discharging the heat to the interior of the at least one structure in the first flow direction based on the circulating of the working fluid. Further, the at least one exterior heat exchange unit may be configured for discharging the heat to the exterior of the at least one structure in the second flow direction based on the circulating of the working fluid. Further, the at least one interior heat exchange unit may be configured for absorbing the heat from the interior of the at least one structure in the second flow direction based on the circulating of the working fluid. Further, the at least one exterior heat exchange unit may include a first exterior port and a second exterior port. Further, the at least one interior heat exchange unit may include a first interior port and a second interior port. Further, the at least one compressor unit may include an inlet port and an outlet port. Further, the at least one flow switching device may include a first device port, a second device port, a third device port, and a fourth device port. Further, the outlet port may be fluidly coupled with the first device port using at least one first coupling element. Further, the second device port may be fluidly coupled with the first exterior port using at least one second coupling element. Further, the second exterior port may be fluidly coupled with the second interior port using at least one third coupling element. Further, the first interior port may be fluidly coupled with the fourth device port using at least one fourth coupling element. Further, the third device port may be fluidly coupled with the inlet port using at least one fifth coupling element. Further, the at least one exterior heat exchange unit may include a plurality of exterior tubes. Further, the plurality of exterior tubes may be fluidly coupled in at least one coupling configuration defining the first exterior port and the second exterior port. Further, the at least one interior heat exchange unit may include a plurality of interior tubes. Further, the plurality of interior tubes may be fluidly coupled in at least one coupling configuration defining the first interior port and the second interior port.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
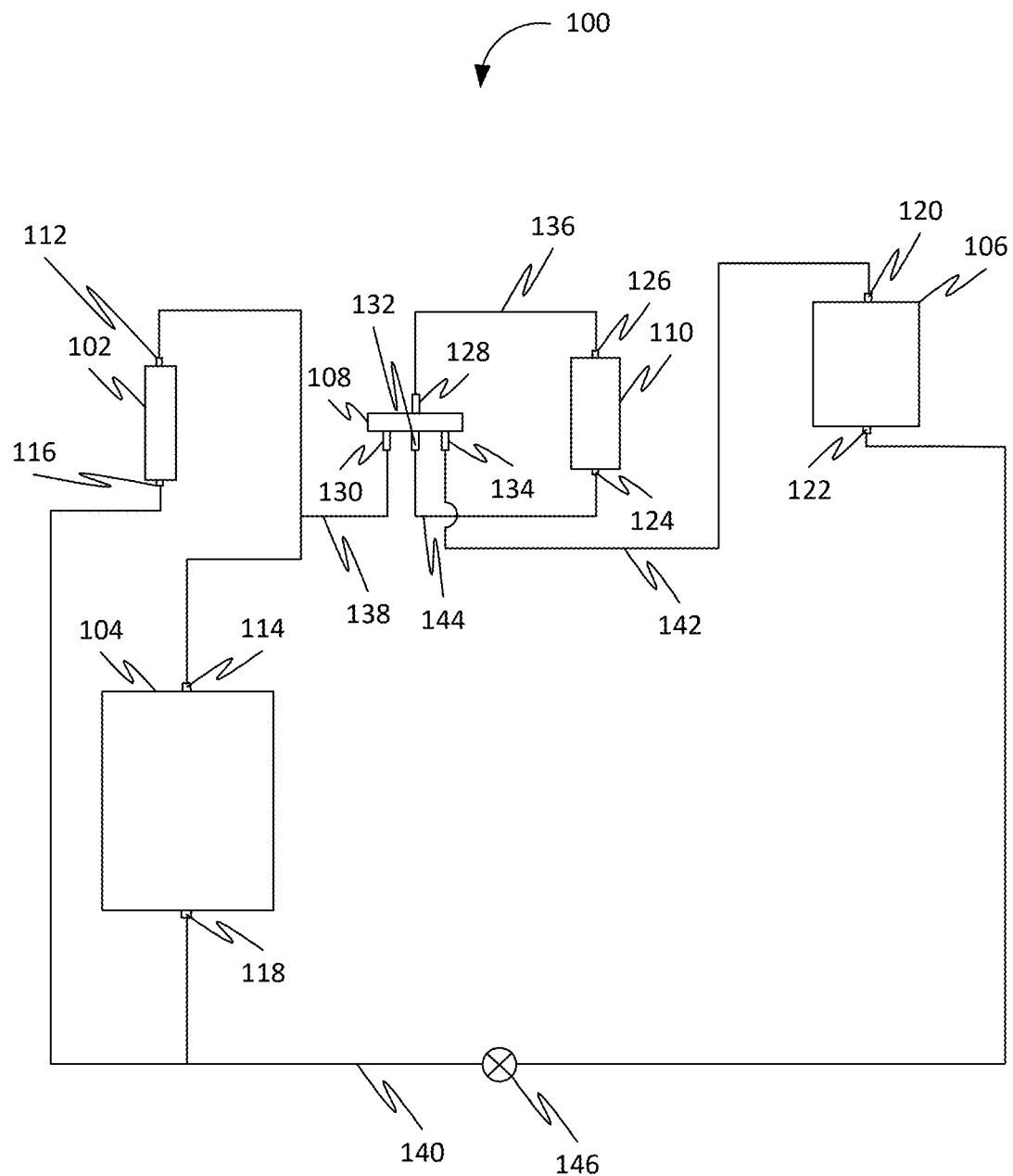
FIG. 1 is a schematic diagram of a thermal management system 100 for structures, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a thermal management system for structures, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Overview:

Further, the present disclosure describes a thermal management system for structures.

Further, the thermal management system may include a building heating and cooling combined supply system.

Further, the building heating and cooling combined supply system may be applied to buildings, mobile buildings, and mobile mechanical vehicles (such as RVs). The system includes (a) an external heat exchange system, (b) a four-way valve, (c) a compressor, and (d) a micro-tube system.

Further, the external heat exchange system may perform heat exchange using two methods. In the first method, the external heat exchange system uses air as the heat source. Further, in the first method, the external heat exchange system includes components such as a heat exchanger, Fan, and Refrigerant (including carbon dioxide refrigerant). In the second method, the external heat exchange system uses ground, geothermal, water, or building exterior surfaces as the heat source. Further, in the second method, the external heat exchange system may include components such as a heat exchanger and refrigerant (including carbon dioxide refrigerant). Further, the external heat exchange system may be the heat exchanger that includes the refrigerant, and uses the ground, the geothermal, the water, or the building exterior surfaces as the heat source. The heat exchanger consists of micro-tubes with an inner diameter of 1 mm to 6 mm and a wall thickness of 0.5 mm to 2 mm, or metal mesh tubes with an inner diameter of 0.1 mm to 1 mm. The metal tubes are coated with anti-corrosive and thermally conductive materials, with a coating thickness of 0.1 mm to 1.5 mm. The anti-corrosive and thermally conductive materials include at least one Polybutene, PERT, paint, or carbon fiber. Multiple tubes are connected in parallel to form a group, and multiple groups are connected in parallel or series and then linked to the four-way valve.

Further, the micro-tube system includes a Metal tube capillary network, a Metal mesh tube capillary network, or a Carbon fiber capillary network. The inner diameter ranges from 1 mm to 3 mm, with a wall thickness of 0.5 mm to 2 mm for metal tubes, or 0.1 mm to 1 mm for metal mesh tubes or carbon fiber tubes. The metal tubes are coated with anti-corrosive and thermally conductive materials, with a coating thickness of 0.1 mm to 1.5 mm. The anti-corrosive and thermally conductive materials include at least one Polybutene, PERT, paint, or carbon fiber. Multiple tubes are connected in parallel to form a group, and multiple groups are connected in parallel or series and then linked to the four-way valve.

The refrigerant (including carbon dioxide refrigerant) and micro-tube capillary network system can be combined in the following ways:
1. Multiple micro-tubes are connected in parallel to form a group, and multiple groups are connected in parallel or series, then fixed on the building floor and ceiling, and covered with at least one cement mortar, adhesive mortar, self-leveling compound, or gypsum, then connected to the four-way valve.
2. Multiple micro-tubes are connected in parallel to form a group, and multiple groups are connected in parallel or series, then fixed on the building floor, and covered with at least one cement mortar, adhesive mortar, or self-leveling compound, then connected to the four-way valve.
3. Multiple micro-tubes are connected in parallel to form a group, and multiple groups are connected in parallel or series, then fixed on the floor of movable structures or mobile mechanical vehicles (such as RVs), and covered with one or more layers of structural mesh, cement mortar, adhesive mortar, or self-leveling compound, then connected to the four-way valve.
4. Single or multiple micro-tubes are pre-assembled in the factory within prefabricated building panels, or combined with at least one Polybutene mesh, plastic mesh, PERT mesh, carbon fiber mesh, metal mesh, metal plate mesh, or metal plates. These prefabricated parts can be transported, stacked, disassembled, or rolled up and then transported to the construction site. Multiple tubes are connected in parallel to form a group, and multiple groups are connected in parallel or series, then fixed on the building, movable building, or mobile mechanical vehicle (such as RV) floor, ceiling, or walls, at least one of these locations, then connected to the four-way valve. The connection between micro tubes can be achieved through mechanical connection, quick mechanical extrusion using metal prefabricated joints, welding, high-frequency welding, or rubber casting, at least one of these methods.

The operating principle of the building heating and cooling combined supply system is as follows: The compressor operates, connecting the intake and outlet ports of the four-way valve, with the other two ports connected to the external heat exchange system and the indoor micro-tube capillary network, respectively. By adjusting the four-way valve direction, indoor heating or cooling requirements are met. This system utilizes the high heat exchange efficiency of the capillary network, specifying the optimal spacing between micro-tubes and the optimal thickness of the capillary network coating layer, forming an efficient and energy-saving system. It reduces water resource usage, lowers carbon emissions, is frost-resistant, maintenance-free, noise-free, wind-free, reliable, and durable, with a lifespan matching that of the building, has low operating costs for heating and cooling, more comfortable and healthier, and easy and quick to install. It is the ideal combined heating and cooling supply system for improving future living quality.

Further, the combined heating and cooling system for buildings, mobile buildings, and mobile mechanical vehicles (such as RVs) include an external heat exchange system, which can utilize air, ground, geothermal, water, or building exterior surfaces as heat sources, a four-way valve for directing the refrigerant flow, a compressor for circulating the refrigerant, and a micro-tube system, which includes metal or carbon fiber capillary networks with anti-corrosive and thermally conductive coatings. Further, the micro-tube system may be installed in floors, ceilings, and walls, and connected in parallel or series to the four-way valve. The system is designed for high efficiency, reducing water usage, carbon emissions, and maintenance needs while providing a quiet and comfortable indoor environment. Detailed diagrams and a schematic are included for reference.

Further, the combined heating and cooling system may be integrated system for both heating and cooling thereby reducing installation and operational costs. Further, the combined heating and cooling system may have high efficiency with capillary network heat exchange and have reduced energy consumption. Further, the combined heating and cooling system may be low maintenance, noise-free, and durable, and also match the lifespan of the building. Further, the combined heating and cooling system offers flexible installation options for different building types and mobile structures.

Further, the combined heating and cooling system provides an integrated design of heating and cooling systems. Further, the combined heating and cooling system uses specific configurations and materials used in the micro-tube system. Further, the combined heating and cooling system innovatively uses the four-way valve for directing refrigerant flow.

FIG. 1 is a schematic diagram of a thermal management system 100 for structures, in accordance with some embodiments. Accordingly, the thermal management system 100 may include at least one exterior heat exchange unit 102-104, at least one interior heat exchange unit 106, at least one flow switching device 108, and at least one compressor unit 110.

Figure 2:
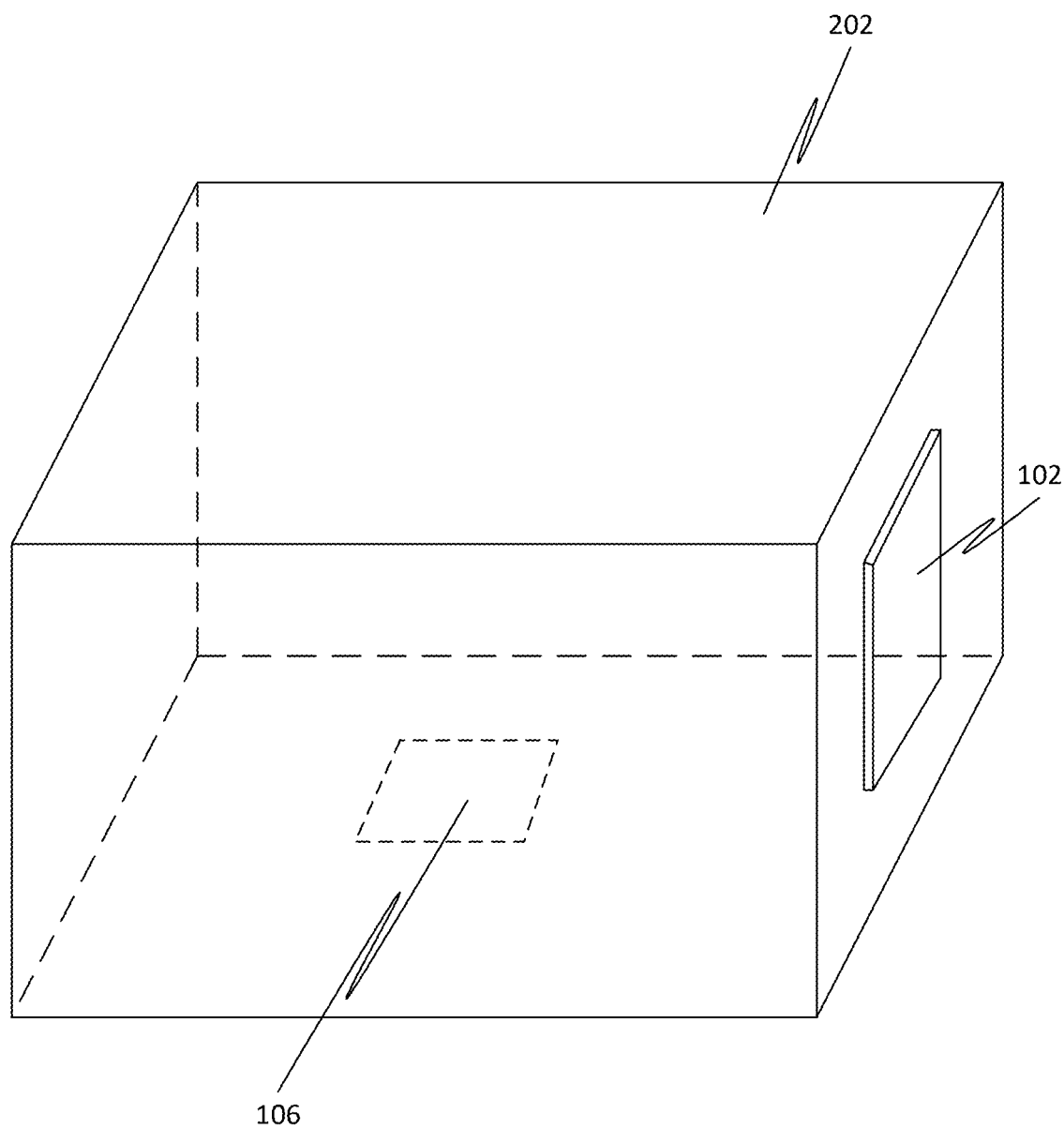
FIG. 2 is a top perspective view the at least one structure 202 comprising the at least one exterior heat exchange unit 102 and the at least one interior heat exchange unit 106, in accordance with some embodiments.

Further, the at least one exterior heat exchange unit 102-104 may be configured to be disposed exterior to at least one structure 202, as shown in FIG. 2. Further, the at least one structure 202 may include a building, a house, a facility, a housing compartment, a mobile house, a vehicle's housing compartment, etc. Further, the at least one exterior heat exchange unit 102-104 may include a heat exchanger, a condenser, an evaporator, etc. Further, the at least one exterior heat exchange unit 102-104 may be comprised of fins and tubes. Further, the at least one exterior heat exchange unit 102-104 may be configured for exchanging heat with air, water, ground surface, subsurface, a structure's exterior surface (wall surface, roof surface, etc), etc. Further, the at least one exterior heat exchange unit 102-104 may include a first exterior heat exchange unit 102 and a second exterior heat exchange unit 104. Further, the first exterior heat exchange unit 102 may be an air source heat exchange unit. Further, the second exterior heat exchange unit 104 may be a gound source, soil source, and water source heat exchange unit. Further, the thermal management system 100 either includes the first exterior heat exchange unit 102 or the second exterior heat exchange unit 104. Further, the first exterior heat exchange unit 102 and the second exterior heat exchange unit 104 may not be required simultaneously by the thermal management system 100.

Further, the at least one interior heat exchange unit 106 may be configured to be disposed in an interior of the at least one structure 202. Further, the at least one interior heat exchange unit 106 may include a heat exchanger, a condenser, an evaporator, etc. Further, the at least one interior heat exchange unit 106 may be comprised of fins and tubes. Further, the at least one interior heat exchange unit 106 may be configured for exchanging heat with an interior component of the at least one structure 202, air, etc. Further, the at least one interior heat exchange unit 106 may include a microtube system, a microtube heat exchanger, a capillary network heat exchanger, etc.

Further, the at least one flow switching device 108 may be fluidly coupled with the at least one exterior heat exchange unit 102-104 and the at least one interior heat exchange unit 106. Further, the at least one flow switching device 108 may be configured for switching a direction of flow of a working fluid between a first direction of flow and a second direction of flow. Further, the first direction of flow may be opposite to the second direction of flow. Further, the working fluid flows between the at least one exterior heat exchange unit 102-104 and the at least one interior heat exchange unit 106. Further, the at least one flow switching device 108 may include a four way valve. Further, the at least one flow switching device 108 may be electrically actuated. Further, the at least one flow switching device 108 may be electrically powered.

Further, the at least one compressor unit 110 may be fluidly coupled with the at least one flow switching device 108. Further, the at least one compressor unit 110 may be configured for circulating the working fluid between the at least one exterior heat exchange unit 102-104 and the at least one interior heat exchange unit 106 based on the direction of flow. Further, the circulating may include drawing the working fluid in a first state and discharging the working fluid in a second state after compressing the working fluid. Further, the first state may include a compressed state and the second state may include an uncompressed state. Further, a temperature and a pressure of the working fluid in the first state may be higher than a temperature and a pressure of the working fluid in the second state. Further, the working fluid in the first state may be drawn from the at least one exterior heat exchange unit 102-104 and the working fluid in the second state may be discharged to the at least one interior heat exchange unit 106 in the first direction of flow. Further, the working fluid in the first state may be drawn from the at least one interior heat exchange unit 106 and the working fluid in the second state may be discharged to the at least one exterior heat exchange unit 102-104 in the second direction of flow. Further, the at least one exterior heat exchange unit 102-104 may be configured for absorbing heat from the exterior of the at least one structure 202 in the first flow direction based on the circulating of the working fluid. Further, the at least one interior heat exchange unit 106 may be configured for discharging the heat to the interior of the at least one structure 202 in the first flow direction based on the circulating of the working fluid. Further, the at least one exterior heat exchange unit 102-104 may be configured for discharging the heat to the exterior of the at least one structure 202 in the second flow direction based on the circulating of the working fluid. Further, the at least one interior heat exchange unit 106 may be configured for absorbing the heat from the interior of the at least one structure 202 in the second flow direction based on the circulating of the working fluid. Further, the at least one compressor unit 110 may be electrically actuated. Further, the at least one compressor unit 110 may be electrically powered. Further, the at least one compressor unit 110 may include a positive displacement compressor, a hermetic scroll compressor, a rotatory compressor, a reciprocating compressor, a centrifugal compressor, etc. Further, the at least one compressor unit 110 may include a housing (casing), a compression mechanism, a motor (electric motor), an engine, a pump (electric pump), etc. Further, the motor or the engine may drive the compression mechanism for performing compression of the working fluid in an interior space defined by the housing. Further, the interior space may be defined by a cylinder comprised in the housing. Further, the compression mechanism may include pistons, cranks, screws, vanes, impellers, blades, scrolls, etc. Further, the pump drives the working fluid.

Further, in some embodiments, the at least one exterior heat exchange unit 102-104 may include a first exterior port (112 and 114) and a second exterior port (116 and 118). Further, the working fluid flows through the at least one exterior heat exchange unit 102-104 via the first exterior port (112 and 114) and the second exterior port (116 and 118). Further, the at least one interior heat exchange unit 106 may include a first interior port 120 and a second interior port 122. Further, the working fluid flows through the at least one interior heat exchange unit 106 via the first interior port 120 and the second interior port 122. Further, the at least one compressor unit 110 may include an inlet port 124 and an outlet port 126. Further, the inlet port 124 may be a suction port for the drawing of the working fluid. Further, the outlet port 126 may include a discharge port for the discharging of the working fluid. Further, the at least one flow switching device 108 may include a first device port 128, a second device port 130, a third device port 132, and a fourth device port 134. Further, the outlet port 126 may be fluidly coupled with the first device port 128 using at least one first coupling element 136. Further, the second device port 130 may be fluidly coupled with the first exterior port (112 and 114) using at least one second coupling element 138. Further, the second exterior port (116 and 118) may be fluidly coupled with the second interior port 122 using at least one third coupling element 140. Further, the first interior port 120 may be fluidly coupled with the fourth device port 134 using at least one fourth coupling element 142. Further, the third device port 132 may be fluidly coupled with the inlet port 124 using at least one fifth coupling element 144. Further, the at least one first coupling element 136, the at least one second coupling element 138, the at least one third coupling element 140, at least one fourth coupling element 142, and the at least one fifth coupling element 144 may include pipes, tubes, channels, ducts, passageway, etc., a network of the pipes, the tubes, the channels, the ducts, the passageway, etc., etc.

In an embodiment, the thermal management system 100 may include an expansion valve 146. Further, the expansion valve 146 may be comprised in the at least one fifth coupling element 144. Further, the expansion valve 146 may be a bidirectional expansion valve. Further, the expansion valve 146 may be electrically actuated. Further, the expansion valve 146 may be configured for reducing a pressure of the working fluid flowing in the at least one fifth coupling element 144 between the at least one exterior heat exchange unit 102-104 and the at least one interior heat exchange unit 106 based on the direction of flow.

Further, in an embodiment, the at least one flow switching device 108 may be configured for fluidly coupling the first device port 128 with the fourth device port 134, and the second device port 130 with the third device port 132. Further, the switching of the direction of flow to the first direction of flow may be based on the fluidly coupling of the first device port 128 with the fourth device port 134, and the second device port 130 with the third device port 132. Further, the fluidly coupling of the first device port 128 with the fourth device port 134, and the second device port 130 with the third device port 132 allows flowing of the working fluid between the first device port 128 and the fourth device port 134, and the second device port 130 and the third device port 132, and restrict the flowing of the working fluid between any other ports.

Further, in an embodiment, the at least one flow switching device 108 may be configured for fluidly coupling the first device port 128 with the second device port 130, and the third device port 132 with the fourth device port 134. Further, the switching of the direction of flow to the second direction of flow may be based on the fluidly coupling of the first device port 128 with the second device port 130, and the third device port 132 with the fourth device port 134. Further, the fluidly coupling of the first device port 128 with the second device port 130, and the third device port 132 with the fourth device port 134 allows flowing of the working fluid between the first device port 128 and the second device port 130, and the third device port 132 and the fourth device port 134, and restrict the flowing of the working fluid between any other ports.

Further, in an embodiment, the at least one exterior heat exchange unit 102-104 may include a plurality of exterior tubes. Further, the plurality of exterior tubes may be fluidly coupled in at least one coupling configuration defining the first exterior port (112 and 114) and the second exterior port (116 and 118). Further, the plurality of exterior tubes may include pipes, ducts, channels, passageways, etc. Further, the at least one coupling configuration may include a parallel configuration, a series configuration, a mesh configuration, etc. Further, a number of exterior tubes of the plurality of exterior tubes may be connected in parallel to form a group. Further, a plurality of groups may be connected in parallel in the parallel configuration or series in the series configuration. Further, the plurality of exterior tubes may be comprised of a material comprising Polybutene, Polyethylene of Raised Temperature resistance (PERT) material, carbon fiber, etc. Further, the fluidly coupling of the plurality of exterior tubes in the at least one coupling configuration forms a network of the plurality of exterior tubes.

Further, in an embodiment, at least one of the plurality of exterior tubes may be characterized by at least one of an inner diameter and a wall thickness. Further, the inner diameter ranges from 1 millimeter (mm) to 6 millimeters (mm). Further, the wall thickness ranges from 0.5 millimeters (mm) to 2 millimeters (mm).

Further, in an embodiment, at least one of the plurality of exterior tubes may be coated with a coating of at least one material. Further, the at least one material may be at least one of anti corrosive and thermally conductive. Further, in an embodiment, the coating of the at least one material may be characterized by a coating thickness. Further, the coating thickness ranges from 0.1 millimeters (mm) to 1.5 millimeters (mm). Further, the at least one material may include Polybutene, Polyethylene of Raised Temperature resistance (PERT) material, paint, carbon fiber, etc.

Further, in an embodiment, the at least one interior heat exchange unit 106 may include a plurality of interior tubes. Further, the plurality of interior tubes may be fluidly coupled in at least one coupling configuration defining the first interior port 120 and the second interior port 122. Further, the at least one coupling configuration may include a parallel configuration, a series configuration, a mesh configuration, etc. Further, a number of interior tubes of the plurality of interior tubes may be connected in parallel to form a group. Further, a plurality of groups may be connected in parallel in the parallel configuration or series in the series configuration. Further, the plurality of interior tubes may be comprised of a material comprising Polybutene, Polyethylene of Raised Temperature resistance (PERT) material, carbon fiber, etc. Further, the fluidly coupling of the plurality of interior tubes in the at least one coupling configuration forms a network of the plurality of interior tubes.

Further, in an embodiment, at least one of the plurality of interior tubes may be characterized by at least one of an inner diameter and a wall thickness. Further, the inner diameter ranges from 1 millimeter (mm) to 3 millimeters (mm). Further, the wall thickness ranges from 0.5 millimeters (mm) to 2 millimeters (mm).

Further, in an embodiment, at least one of the plurality of interior tubes may be coated with a coating of at least one material. Further, the at least one material may be at least one of anti corrosive and thermally conductive. Further, the at least one material may include Polybutene, Polyethylene of Raised Temperature resistance (PERT) material, paint, carbon fiber, etc.

Further, in an embodiment, the coating of the at least one material may be characterized by a coating thickness. Further, the coating thickness ranges from 0.1 millimeters (mm) to 1.5 millimeters (mm).

Further, in an embodiment, the at least one interior heat exchange unit 106 may include at least one structural component. Further, the plurality of interior tubes may be incorporated with the at least one structural component. Further, the at least one structural component may be configured to be disposed on at least a portion of an interior surface of the at least one structure 202. Further, the at least one structural component may include a panel, a board, a building panel, etc. Further, the at least one structural component comprised of cement mortar, adhesive mortar, self-leveling compound, etc. Further, the at least one structural component may include a prefabricated building panel.

Further, in an embodiment, the at least one exterior heat exchange unit 102-104 comprising at least one fan assembly. Further, the at least one fan assembly may be configured for blowing air to the plurality of exterior tubes.

Figure 5:
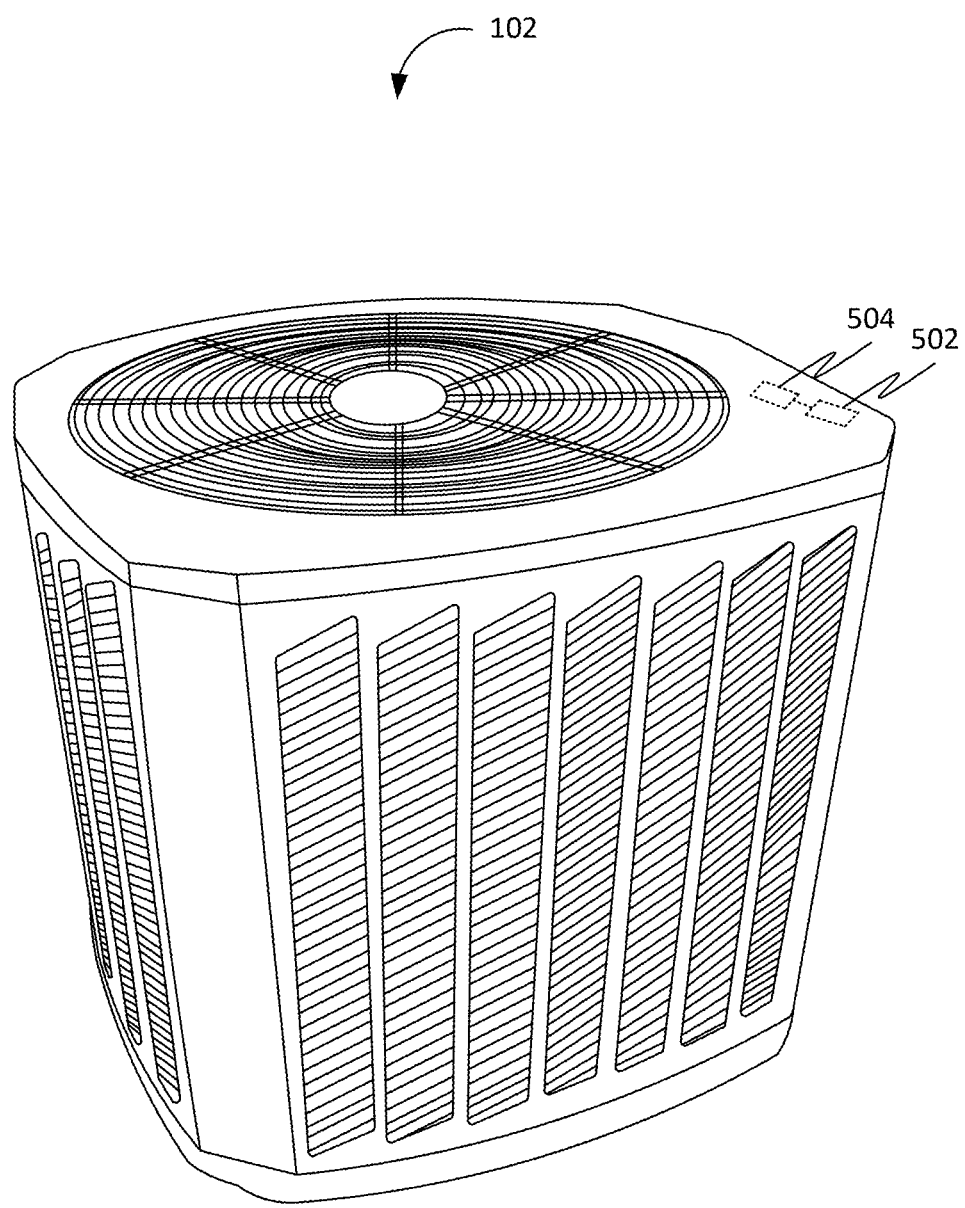
FIG. 5 is a perspective view of the at least one exterior heat exchange unit 102, in accordance with some embodiments.

In an embodiment, the thermal management system 100 may include at least one sensor 502 and a processing device 504, as shown in FIG. 5. Further, the at least one sensor 502 may be disposed on the at least one exterior heat exchange unit 102-104. Further, the at least one sensor 502 may include a temperature sensor, a wind sensor, etc. Further, the at least one sensor 502 may be configured for detecting at least one condition associated with the plurality of exterior tubes. Further, the at least one condition may include a temperature gradient between the plurality of exterior tubes and an environment of the at least one exterior heat exchange unit 102-104, a blowing speed of air on the plurality of exterior tubes, etc. Further, the processing device 504 may be communicatively coupled with the at least one sensor 502. Further, the processing device 504 may be configured for generating at least one condition data associated with the at least one condition based on the detecting. Further, the processing device 504 may be configured for analyzing the at least one condition data. Further, the processing device 504 may be configured for determining at least one blowing parameter for the blowing of the air to the plurality of exterior tubes based on the analyzing. Further, the at least one blowing parameter may include a fan speed, a fan operation duration, etc. Further, the processing device 504 may be configured for generating at least one command for the at least one fan assembly based on the determining. Further, the at least one fan assembly may be operatively coupled with the processing device 504. Further, the blowing of the air may include blowing the air with at least one blowing characteristic based on the at least one command. Further, the at least one blowing characteristic may include a blowing speed, a blowing duration, etc. Further, the at least one blowing characteristic corresponds to the at least one blowing parameter.

Further, in some embodiments, the working fluid may include carbon dioxide. Further, the working fluid may be a refrigerant.

Further, in some embodiments, the thermal management system 100 may include a heat exchange unit. Further, the heat exchange unit may include the at least one exterior heat exchange unit 102-104, the at least one interior heat exchange unit 106, etc. Further, the heat exchange unit may include a plurality of tube groups. Further, the plurality of tube groups may be serially connected defining a first port and a second port. Further, the plurality of tube groups may include a first tube group and a second tube group. Further, the first tube group may include a plurality of first tubes. Further, the plurality of first tubes may be parallelly connected. Further, the second tube group may include a plurality of second tubes. Further, the plurality of second tubes may be parallelly connected. Further, the parallel connection allows parallel flowing of the working fluid. Further, the serial connection allows for serial flowing of the working fluid.

Further, in some embodiments, the thermal management system 100 may include a heat exchange unit. Further, the heat exchange unit may include the at least one exterior heat exchange unit 102-104, the at least one interior heat exchange unit 106, etc. Further, the heat exchange unit may include a plurality of tube groups. Further, the plurality of tube groups may be parallelly connected defining a first port and a second port. Further, the plurality of tube groups may include a first tube group and a second tube group. Further, the first tube group may include a plurality of first tubes. Further, the plurality of first tubes may be parallelly connected. Further, the second tube group may include a plurality of second tubes. Further, the plurality of second tubes may be parallelly connected.

Further, in some embodiments, the thermal management system 100 may include a heat exchange unit. Further, the heat exchange unit may include the at least one exterior heat exchange unit 102-104, the at least one interior heat exchange unit 106, etc. Further, the heat exchange unit may include a plurality of tubes. Further, the plurality of tubes may be fluidly interconnected for forming a tube mesh. Further, the heat exchange unit may include a first port and an exterior port.

Further, in some embodiments, the thermal management system 100 may include a heat exchange unit. Further, the heat exchange unit may include the at least one exterior heat exchange unit 102-104, the at least one interior heat exchange unit 106, etc. Further, the heat exchange unit may include a plurality of tubes defining a first port, and a second port, and a supporting structure. Further, the plurality of tubes may be combined with the supporting structure. Further, the supporting structure may include Polybutene mesh, plastic mesh, PERT mesh, carbon fiber mesh, metal mesh, metal plate mesh, metal plate, etc.

FIG. 2 is a top perspective view the at least one structure 202 comprising the at least one exterior heat exchange unit 102 and the at least one interior heat exchange unit 106, in accordance with some embodiments.

Figure 3:
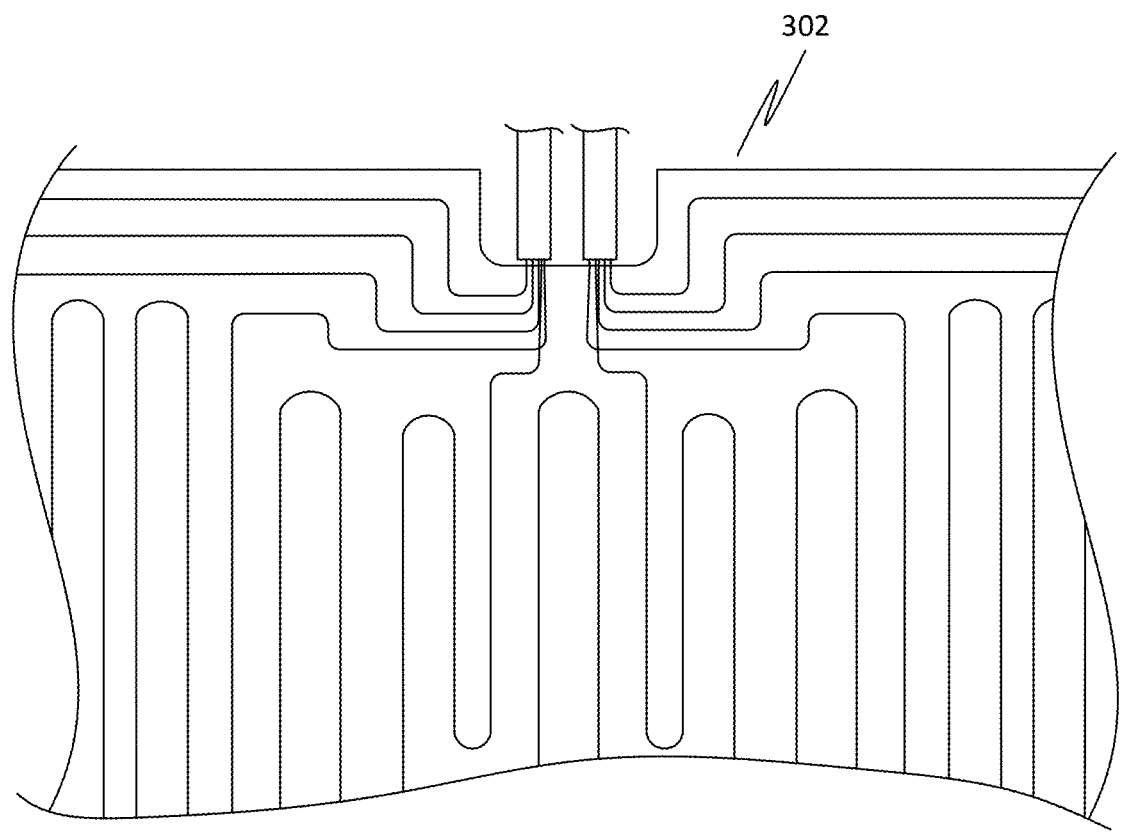
FIG. 3 is a partial top view of a layout of pipes 302 of the at least one interior heat exchange unit 106, in accordance with some embodiments

FIG. 3 is a partial top view of a layout of pipes 302 of the at least one interior heat exchange unit 106, in accordance with some embodiments. Further, the pipes 302 may include tubes, etc.

Figure 4:
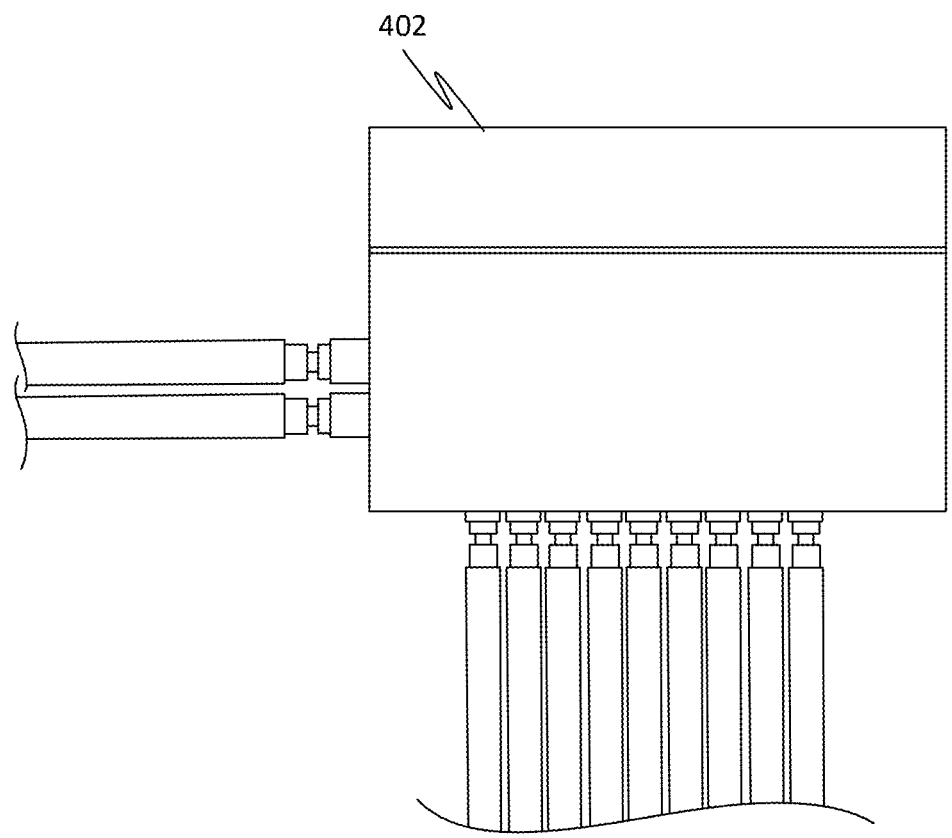
FIG. 4 is a front view of a junction box 402 associated with the pipes 302 of the at least one interior heat exchange unit 106, in accordance with some embodiments.

FIG. 4 is a front view of a junction box 402 associated with the pipes 302 of the at least one interior heat exchange unit 106, in accordance with some embodiments.

FIG. 5 is a perspective view of the at least one exterior heat exchange unit 102, in accordance with some embodiments.

Figure 6:
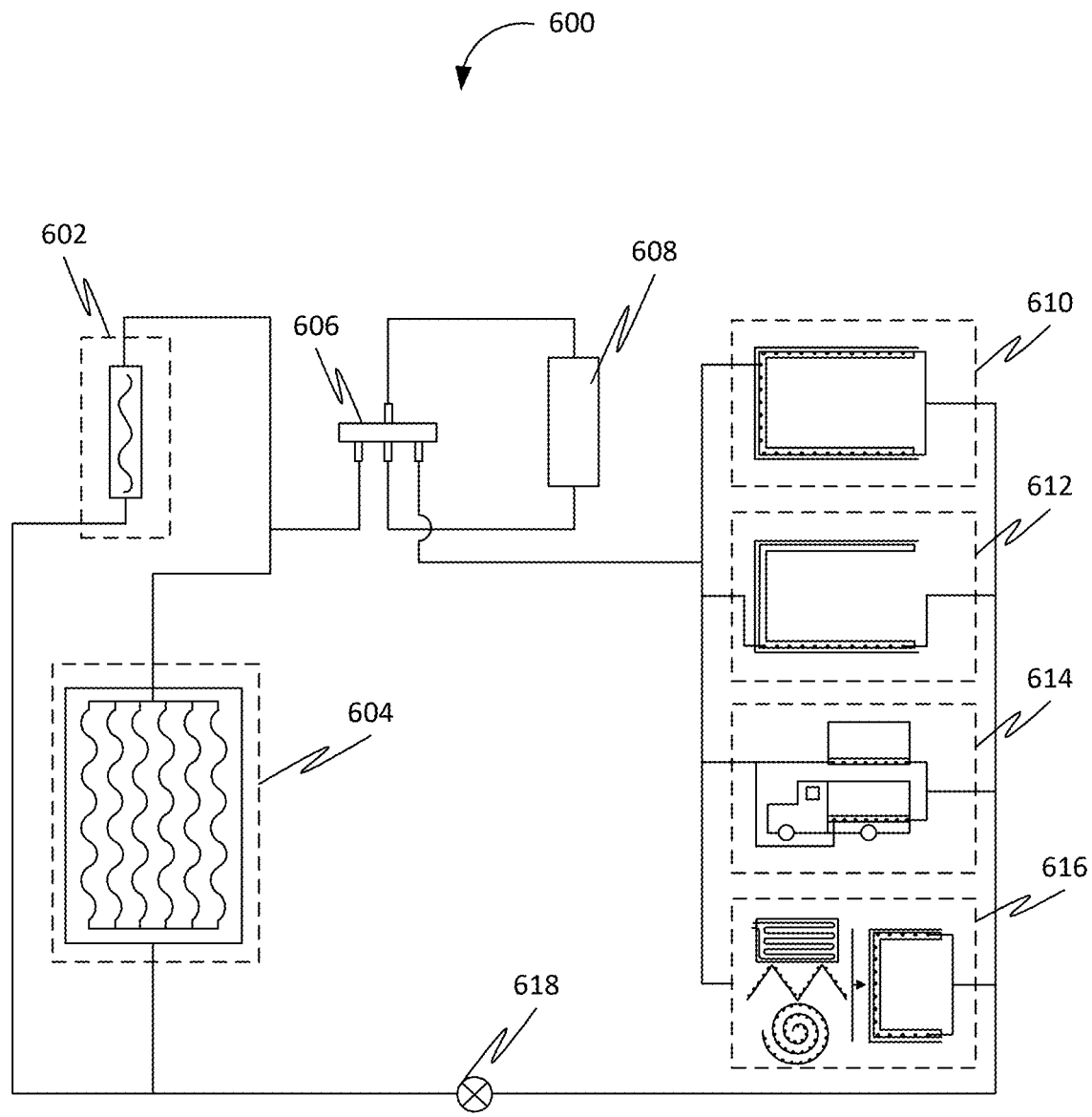
FIG. 6 is a schematic diagram of a thermal management system 600 for structures, in accordance with some embodiments.

FIG. 6 is a schematic diagram of a thermal management system 600 for structures, in accordance with some embodiments. Further, the thermal management system 600 may include a plurality of exterior heat exchange units 602-604, a four way valve 606, a compressor unit 608, a plurality of interior heat exchange units 610-616, and an expansion valve 618.

Further, a first exterior heat exchange unit 602 of the plurality of exterior heat exchange units 602-604 exchange heat with air. Further, a second exterior heat exchange unit 604 of the plurality of exterior heat exchange units 602-604 exchanges heat with ground, soil, water, building surface, etc.

Further, a first interior heat exchange unit 610 of the plurality of interior heat exchange units 610-616 may be disposed in walls, floor, roof, etc., in an interior of a housing unit. Further, a second interior heat exchange unit 612 of the plurality of interior heat exchange units 610-616 may be disposed in floor of a housing unit (compartment). Further, a third interior heat exchange unit 614 of the plurality of interior heat exchange units 610-616 may be disposed in a mobile housing unit, a vehicle (recreational vehicle) housing unit, etc. Further, a fourth interior heat exchange unit 616 of the plurality of interior heat exchange units 610-616 may be disposed in prefabricated building panels.

Figure 7:
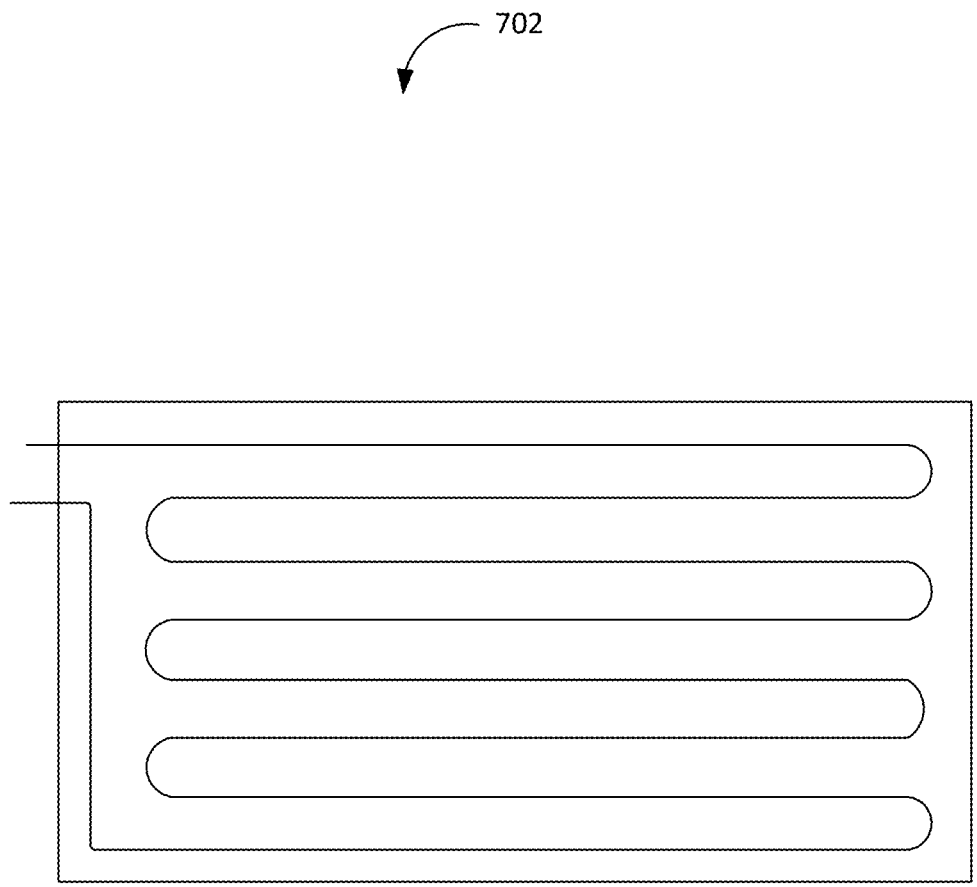
FIG. 7 is a top view of a straight prefabricated panel 702 of an interior heat exchange unit 616, in accordance with some embodiments.

FIG. 7 is a top view of a straight prefabricated panel 702 of an interior heat exchange unit 616, in accordance with some embodiments.

Figure 8:
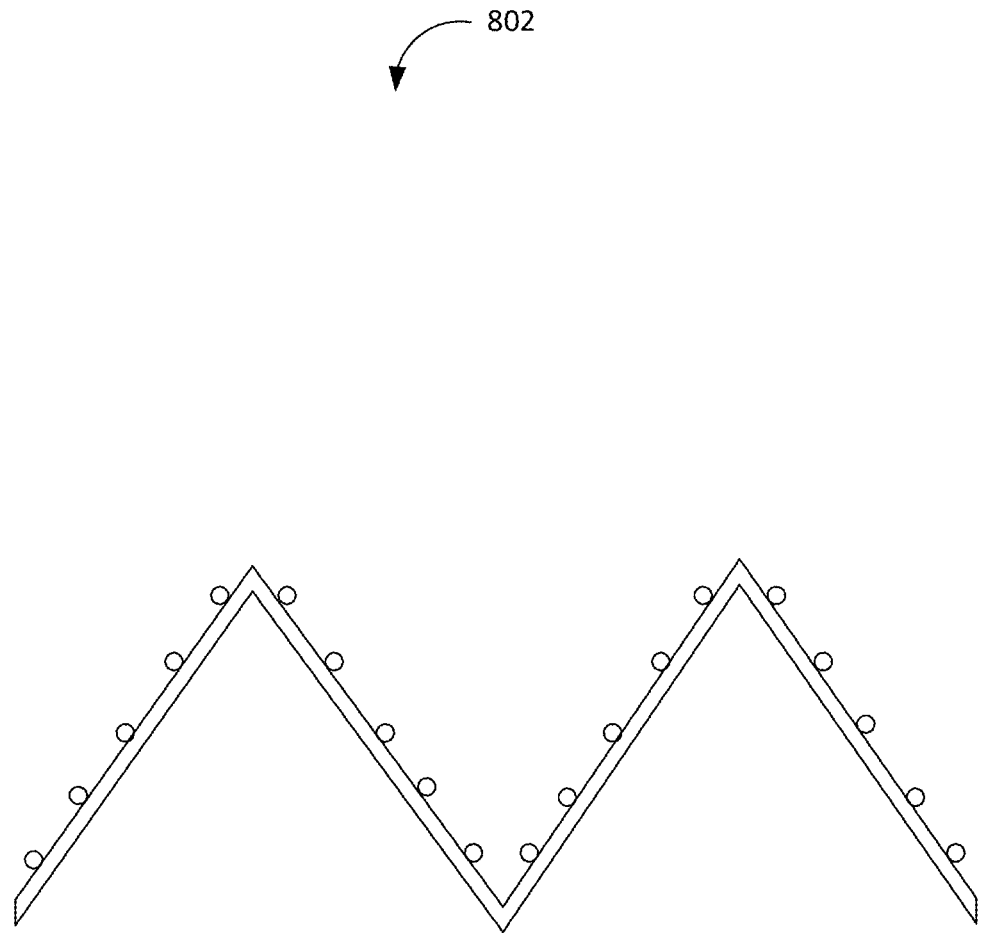
FIG. 8 is a side view of a foldable prefabricated panel 802 of the interior heat exchange unit 616, in accordance with some embodiments.

FIG. 8 is a side view of a foldable prefabricated panel 802 of the interior heat exchange unit 616, in accordance with some embodiments.

Figure 9:
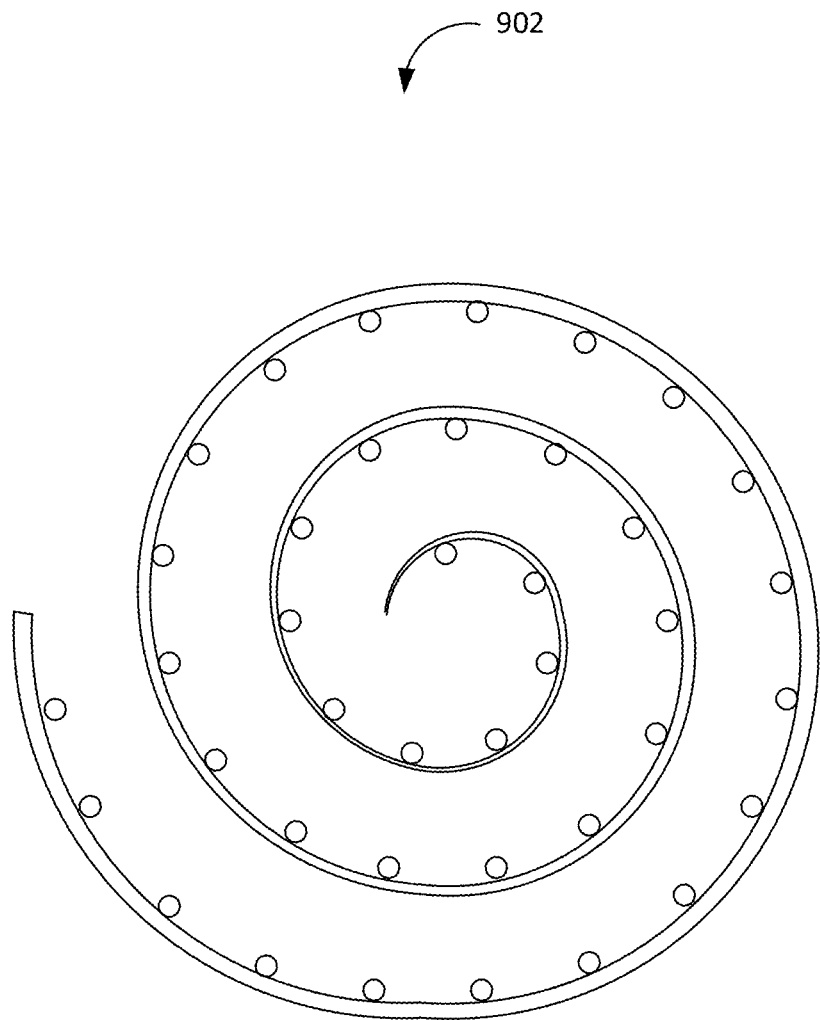
FIG. 9 is a side view of a rollable prefabricated panel 902 of the interior heat exchange unit 616, in accordance with some embodiments.

FIG. 9 is a side view of a rollable prefabricated panel 902 of the interior heat exchange unit 616, in accordance with some embodiments.

Figure 10:
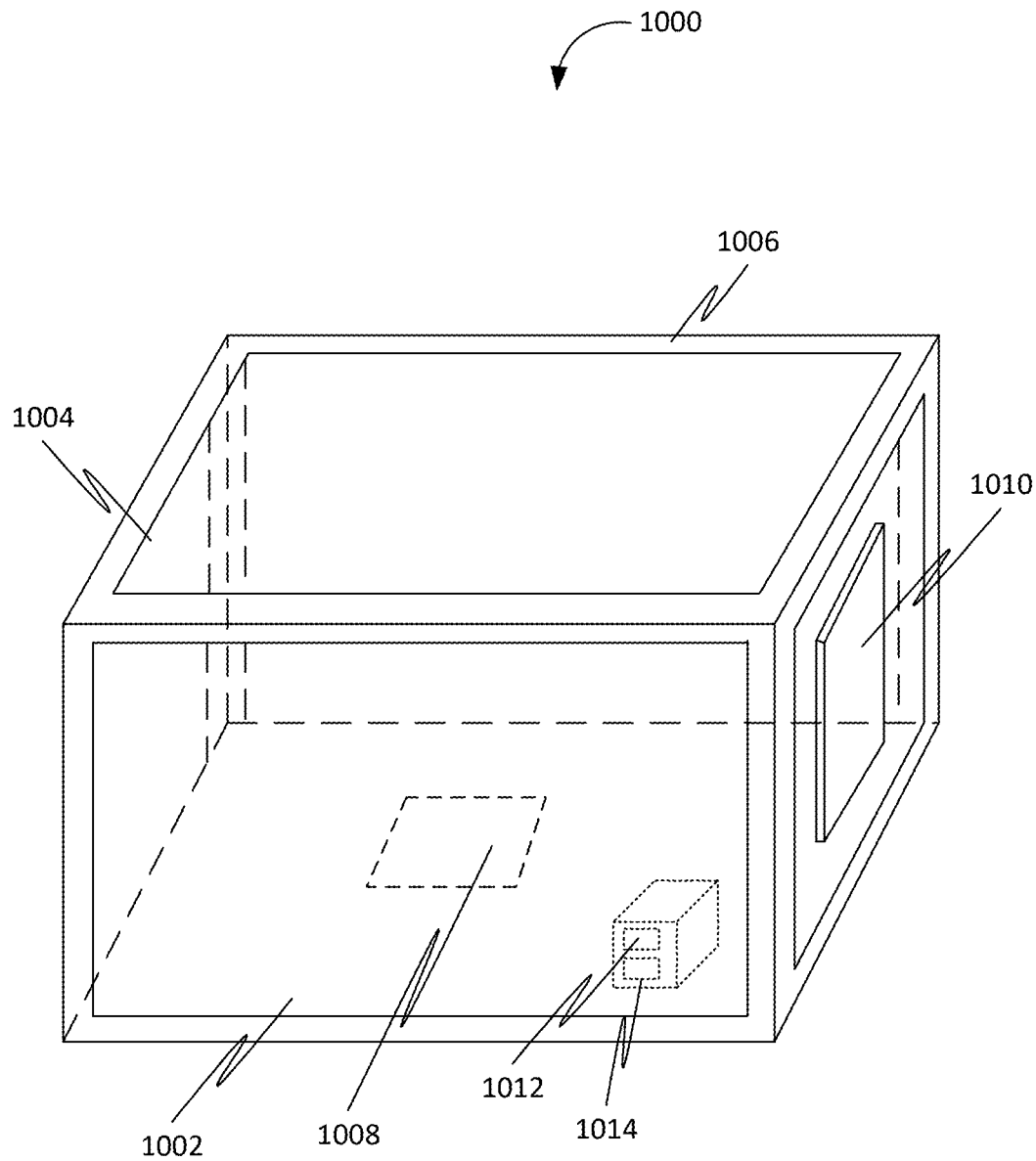
FIG. 10 is a perspective view of a structure 1000 for facilitating thermal management, in accordance with some embodiments.

FIG. 10 is a perspective view of a structure 1000 for facilitating thermal management, in accordance with some embodiments. Further, the structure 1000 may be a modular structure. Further, the structure 1000 may include a housing compartment, a mobile housing compartment, a vehicle (recreational vehicle) housing compartment, etc. Further, the structure 1000 may be configured to be modularly constructed. Further, the structure 1000 may include a plurality of modular structural components 1002-1006. Further, the plurality of modular structural components 1002-1006 may include panels, boards, etc., for forming walls, roof, floor, etc. of the structure 1000. Further, at least one of the plurality of modular structural components 1002-1006 may include at least one interior heat exchange unit 1008. Further, the at least one interior heat exchange unit 1008 may be comprised in at least one of the plurality of modular structural components 1002-1006. Further, at least one of the plurality of modular structural components 1002-1006 may include at least one exterior heat exchange unit 1010 may be disposed on an exterior surface of at least one of the plurality of modular structural components 1002-1006. Further, the structure 1000 may include at least one flow switching device 1012, and at least one compressor unit 1014. Further, the plurality of modular structural components 1002-1006 may include a plurality of frame components. Further, the plurality of frame components may be configured to be interconnected in at least one arrangement for forming a frame of the structure 1000. Further, the plurality of modular structural components 1002-1006 may include may include a plurality of panels. Further, the plurality of panels may configured to be secured to at least a portion of the frame for forming the structure 1000.

Further, the at least one flow switching device 1012 may be fluidly coupled with the at least one exterior heat exchange unit 1010 and the at least one interior heat exchange unit 1008. Further, the at least one flow switching device 1012 may be configured for switching a direction of flow of a working fluid between a first direction of flow and a second direction of flow. Further, the first direction of flow may be opposite to the second direction of flow. Further, the working fluid flows between the at least one exterior heat exchange unit 1010 and the at least one interior heat exchange unit 1008.

Further, the at least one compressor unit 1014 may be fluidly coupled with the at least one flow switching device 1012. Further, the at least one compressor unit 1014 may be configured for circulating the working fluid between the at least one exterior heat exchange unit 1010 and the at least one interior heat exchange unit 1008 based on the direction of flow. Further, the circulating may include drawing the working fluid in a first state and discharging the working fluid in a second state after compressing the working fluid. Further, the working fluid in the first state may be drawn from the at least one exterior heat exchange unit 1010 and the working fluid in the second state may be discharged to the at least one interior heat exchange unit 1008 in the first direction of flow. Further, the working fluid in the first state may be drawn from the at least one interior heat exchange unit 1008 and the working fluid in the second state may be discharged to the at least one exterior heat exchange unit 1010 in the second direction of flow. Further, the at least one exterior heat exchange unit 1010 may be configured for absorbing heat from the exterior of the at least one structure in the first flow direction based on the circulating of the working fluid. Further, the at least one interior heat exchange unit 1008 may be configured for discharging the heat to the interior of the at least one structure in the first flow direction based on the circulating of the working fluid. Further, the at least one exterior heat exchange unit 1010 may be configured for discharging the heat to the exterior of the at least one structure in the second flow direction based on the circulating of the working fluid. Further, the at least one interior heat exchange unit 1008 may be configured for absorbing the heat from the interior of the at least one structure in the second flow direction based on the circulating of the working fluid.

Figure 11:
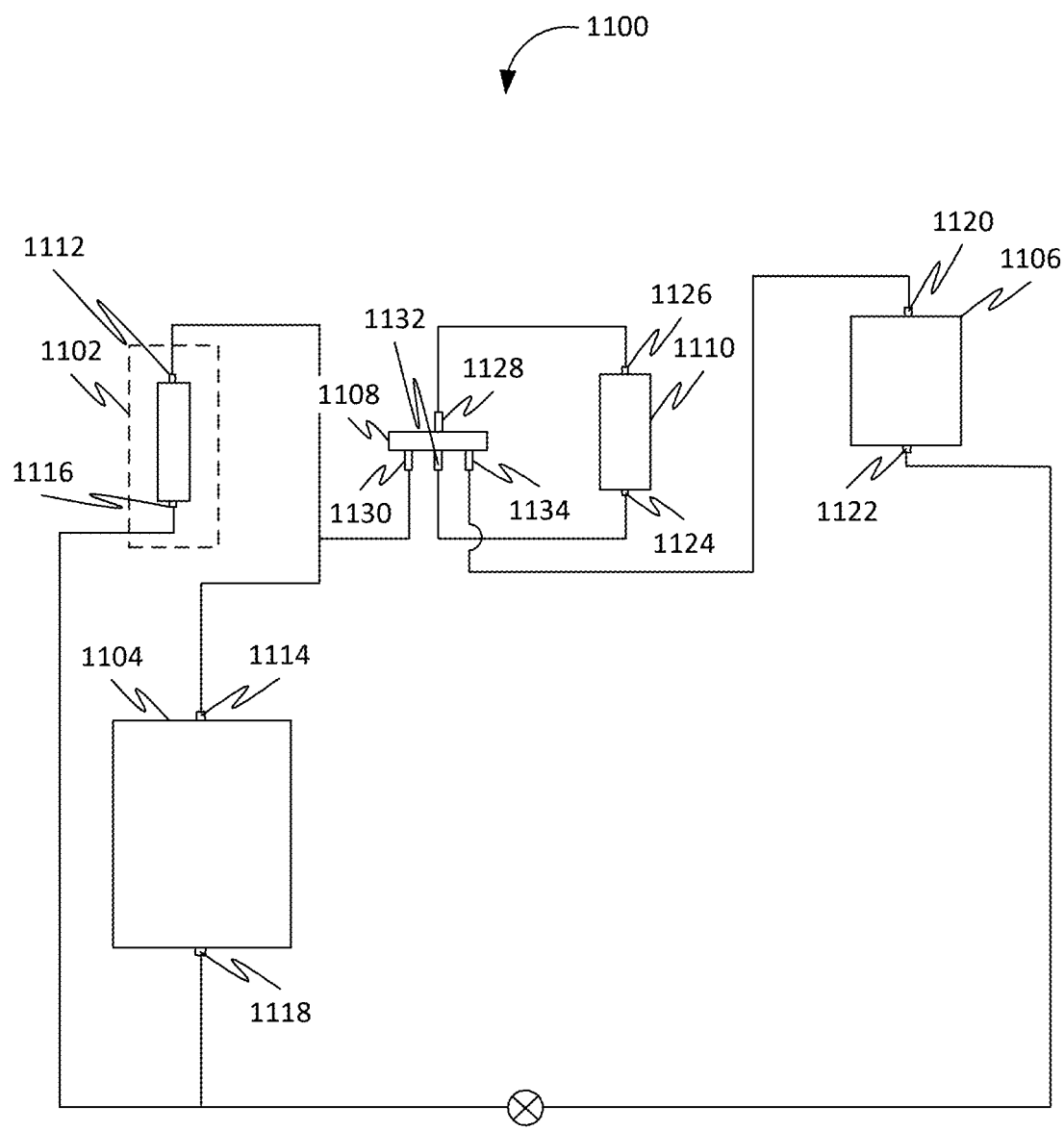
FIG. 11 is a schematic diagram of a thermal management system 1100 for structures, in accordance with some embodiments.

FIG. 11 is a schematic diagram of a thermal management system 1100 for structures, in accordance with some embodiments. Accordingly, the thermal management system 1100 may include at least one exterior heat exchange unit 1102-1104, at least one interior heat exchange unit 1106, at least one flow switching device 1108, and at least one compressor unit 1110.

Further, the at least one exterior heat exchange unit 1102-1104 may be configured to be disposed exterior to at least one structure.

Further, the at least one interior heat exchange unit 1106 may be configured to be disposed in an interior of the at least one structure.

Further, the at least one flow switching device 1108 may be fluidly coupled with the at least one exterior heat exchange unit 1102-1104 and the at least one interior heat exchange unit 1106. Further, the at least one flow switching device 1108 may be configured for switching a direction of flow of a working fluid between a first direction of flow and a second direction of flow. Further, the first direction of flow may be opposite to the second direction of flow. Further, the working fluid flows between the at least one exterior heat exchange unit 1102-1104 and the at least one interior heat exchange unit 1106.

Further, the at least one compressor unit 1110 may be fluidly coupled with the at least one flow switching device 1108. Further, the at least one compressor unit 1110 may be configured for circulating the working fluid between the at least one exterior heat exchange unit 1102-1104 and the at least one interior heat exchange unit 1106 based on the direction of flow. Further, the circulating may include drawing the working fluid in a first state and discharging the working fluid in a second state after compressing the working fluid. Further, the working fluid in the first state may be drawn from the at least one exterior heat exchange unit 1102-1104 and the working fluid in the second state may be discharged to the at least one interior heat exchange unit 1106 in the first direction of flow. Further, the working fluid in the first state may be drawn from the at least one interior heat exchange unit 1106 and the working fluid in the second state may be discharged to the at least one exterior heat exchange unit 1102-1104 in the second direction of flow. Further, the at least one exterior heat exchange unit 1102-1104 may be configured for absorbing heat from the exterior of the at least one structure in the first flow direction based on the circulating of the working fluid. Further, the at least one interior heat exchange unit 1106 may be configured for discharging the heat to the interior of the at least one structure in the first flow direction based on the circulating of the working fluid. Further, the at least one exterior heat exchange unit 1102-1104 may be configured for discharging the heat to the exterior of the at least one structure in the second flow direction based on the circulating of the working fluid. Further, the at least one interior heat exchange unit 1106 may be configured for absorbing the heat from the interior of the at least one structure in the second flow direction based on the circulating of the working fluid. Further, the at least one exterior heat exchange unit 1102-1104 may include a first exterior port (1112 and 1114) and a second exterior port (1116 and 1118). Further, the at least one interior heat exchange unit 1106 may include a first interior port 1120 and a second interior port 1122. Further, the at least one compressor unit 1110 may include an inlet port 1124 and an outlet port 1126. Further, the at least one flow switching device 1108 may include a first device port 1128, a second device port 1130, a third device port 1132, and a fourth device port 1134. Further, the outlet port 1126 may be fluidly coupled with the first device port 1128 using at least one first coupling element. Further, the second device port 1130 may be fluidly coupled with the first exterior port (1112 and 1114) using at least one second coupling element. Further, the second exterior port (1116 and 1118) may be fluidly coupled with the second interior port 1122 using at least one third coupling element. Further, the first interior port 1120 may be fluidly coupled with the fourth device port 1134 using at least one fourth coupling element. Further, the third device port 1132 may be fluidly coupled with the inlet port 1124 using at least one fifth coupling element.

Further, in some embodiments, the at least one flow switching device 1108 may be configured for fluidly coupling the first device port 1128 with the fourth device port 1134, and the second device port 1130 with the third device port 1132. Further, the switching of the direction of flow to the first direction of flow may be based on the fluidly coupling of the first device port 1128 with the fourth device port 1134, and the second device port 1130 with the third device port 1132.

Further, in some embodiments, the at least one flow switching device 1108 may be configured for fluidly coupling the first device port 1128 with the second device port 1130, and the third device port 1132 with the fourth device port 1134. Further, the switching of the direction of flow to the second direction of flow may be based on the fluidly coupling of the first device port 1128 with the second device port 1130, and the third device port 1132 with the fourth device port 1134.

Figure 12:
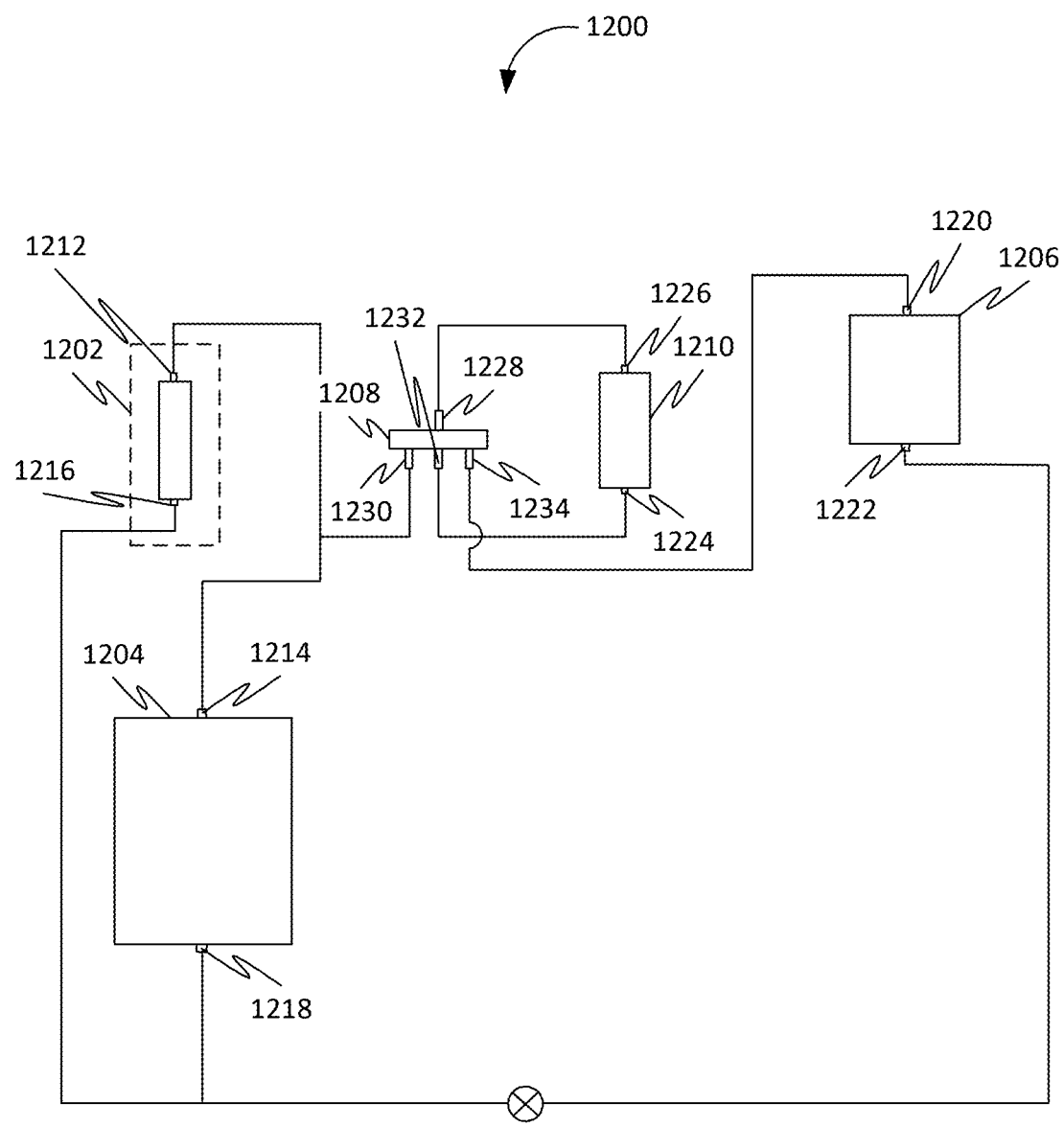
FIG. 12 is a schematic diagram of a thermal management system 1200 for structures, in accordance with some embodiments.

FIG. 12 is a schematic diagram of a thermal management system 1200 for structures, in accordance with some embodiments. Accordingly, the thermal management system 1200 may include at least one exterior heat exchange unit 1202-1204, at least one interior heat exchange unit 1206, at least one flow switching device 1208, and at least one compressor unit 1210.

Further, the at least one exterior heat exchange unit 1202-1204 may be configured to be disposed exterior to at least one structure.

Further, the at least one interior heat exchange unit 1206 may be configured to be disposed in an interior of the at least one structure.

Further, the at least one flow switching device 1208 may be fluidly coupled with the at least one exterior heat exchange unit 1202-1204 and the at least one interior heat exchange unit 1206. Further, the at least one flow switching device 1208 may be configured for switching a direction of flow of a working fluid between a first direction of flow and a second direction of flow. Further, the first direction of flow may be opposite to the second direction of flow. Further, the working fluid flows between the at least one exterior heat exchange unit 1202-1204 and the at least one interior heat exchange unit 1206.

Further, the at least one compressor unit 1210 may be fluidly coupled with the at least one flow switching device 1208. Further, the at least one compressor unit 1210 may be configured for circulating the working fluid between the at least one exterior heat exchange unit 1202-1204 and the at least one interior heat exchange unit 1206 based on the direction of flow. Further, the circulating may include drawing the working fluid in a first state and discharging the working fluid in a second state after compressing the working fluid. Further, the working fluid in the first state may be drawn from the at least one exterior heat exchange unit 1202-1204 and the working fluid in the second state may be discharged to the at least one interior heat exchange unit 1206 in the first direction of flow. Further, the working fluid in the first state may be drawn from the at least one interior heat exchange unit 1206 and the working fluid in the second state may be discharged to the at least one exterior heat exchange unit 1202-1204 in the second direction of flow. Further, the at least one exterior heat exchange unit 1202-1204 may be configured for absorbing heat from the exterior of the at least one structure in the first flow direction based on the circulating of the working fluid. Further, the at least one interior heat exchange unit 1206 may be configured for discharging the heat to the interior of the at least one structure in the first flow direction based on the circulating of the working fluid. Further, the at least one exterior heat exchange unit 1202-1204 may be configured for discharging the heat to the exterior of the at least one structure in the second flow direction based on the circulating of the working fluid. Further, the at least one interior heat exchange unit 1206 may be configured for absorbing the heat from the interior of the at least one structure in the second flow direction based on the circulating of the working fluid. Further, the at least one exterior heat exchange unit 1202-1204 may include a first exterior port (1212 and 1214) and a second exterior port (1216 and 1218). Further, the at least one interior heat exchange unit 1206 may include a first interior port 1220 and a second interior port 1222. Further, the at least one compressor unit 1210 may include an inlet port 1224 and an outlet port 1226. Further, the at least one flow switching device 1208 may include a first device port 1228, a second device port 1230, a third device port 1232, and a fourth device port 1234. Further, the outlet port 1226 may be fluidly coupled with the first device port 1228 using at least one first coupling element. Further, the second device port 1230 may be fluidly coupled with the first exterior port (1212 and 1214) using at least one second coupling element. Further, the second exterior port (1216 and 1218) may be fluidly coupled with the second interior port 1222 using at least one third coupling element. Further, the first interior port 1220 may be fluidly coupled with the fourth device port 1234 using at least one fourth coupling element. Further, the third device port 1232 may be fluidly coupled with the inlet port 1224 using at least one fifth coupling element. Further, the at least one exterior heat exchange unit 1202-1204 may include a plurality of exterior tubes. Further, the plurality of exterior tubes may be fluidly coupled in at least one coupling configuration defining the first exterior port (1212 and 1214) and the second exterior port (1216 and 1218). Further, the at least one interior heat exchange unit 1206 may include a plurality of interior tubes. Further, the plurality of interior tubes may be fluidly coupled in at least one coupling configuration defining the first interior port 1220 and the second interior port 1222.

Figure 13:
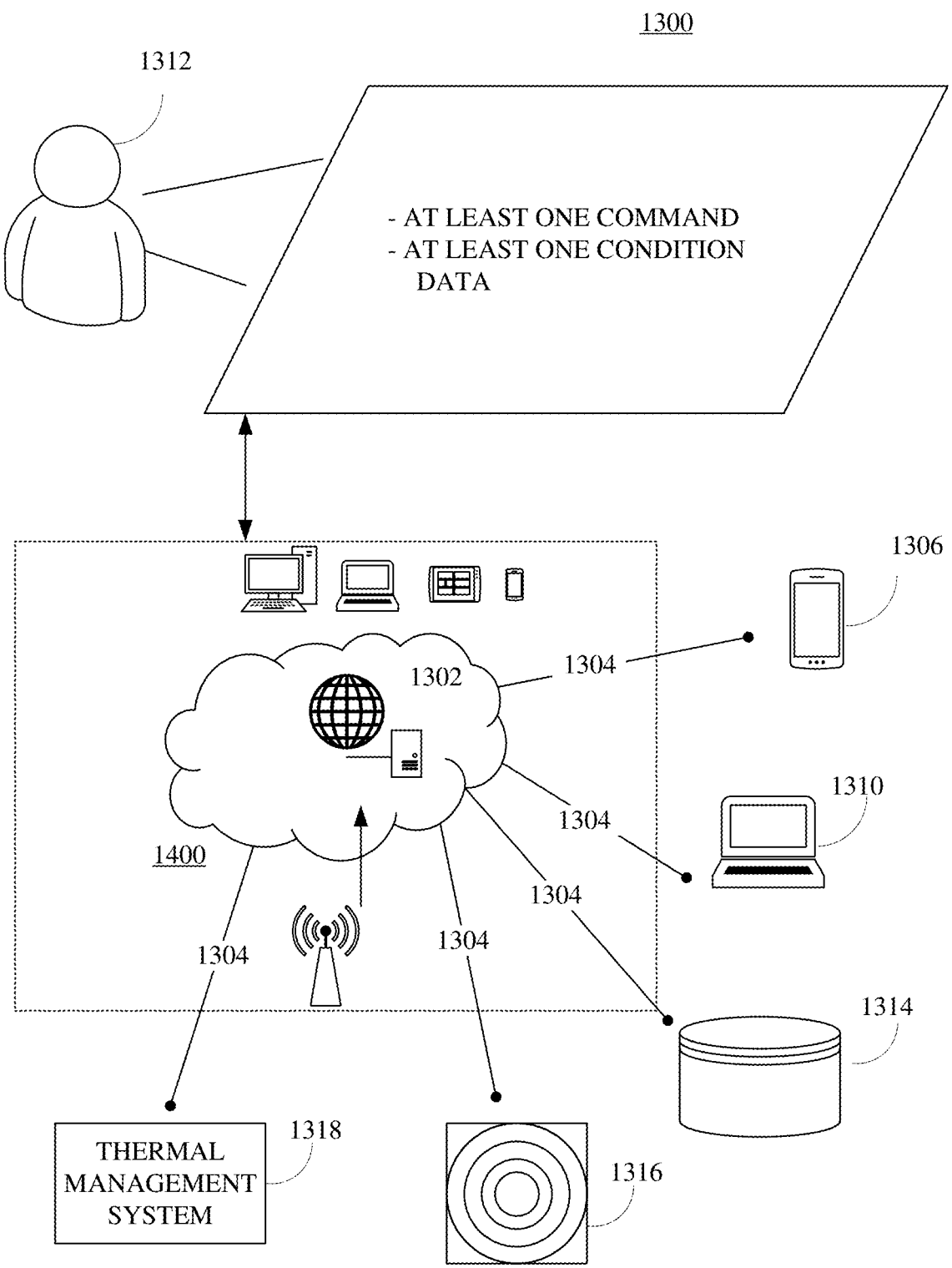
FIG. 13 is an illustration of an online platform consistent with various embodiments of the present disclosure.

FIG. 13 is an illustration of an online platform 1300 consistent with various embodiments of the present disclosure. By way of non-limiting example, the online platform 1300 to facilitate thermal management of structures may be hosted on a centralized server 1302, such as, for example, a cloud computing service. The centralized server 1302 may communicate with other network entities, such as, for example, a mobile device 1306 (such as a smartphone, a laptop, a tablet computer, etc.), other electronic devices 1310 (such as desktop computers, server computers, etc.), databases 1314, sensors 1316, a thermal management system 1318 (such as the thermal management system 100, the thermal management system 1100, the thermal management system 1200, etc.) over a communication network 1304, such as, but not limited to, the Internet. Further, users of the online platform 1300 may include relevant parties such as, but not limited to, end-users, administrators, service providers, service consumers, and so on. Accordingly, in some instances, electronic devices operated by the one or more relevant parties may be in communication with the platform.

A user 1312, such as the one or more relevant parties, may access online platform 1300 through a web based software application or browser. The web based software application may be embodied as, for example, but not be limited to, a website, a web application, a desktop application, and a mobile application compatible with a computing device 1400.

Figure 14:
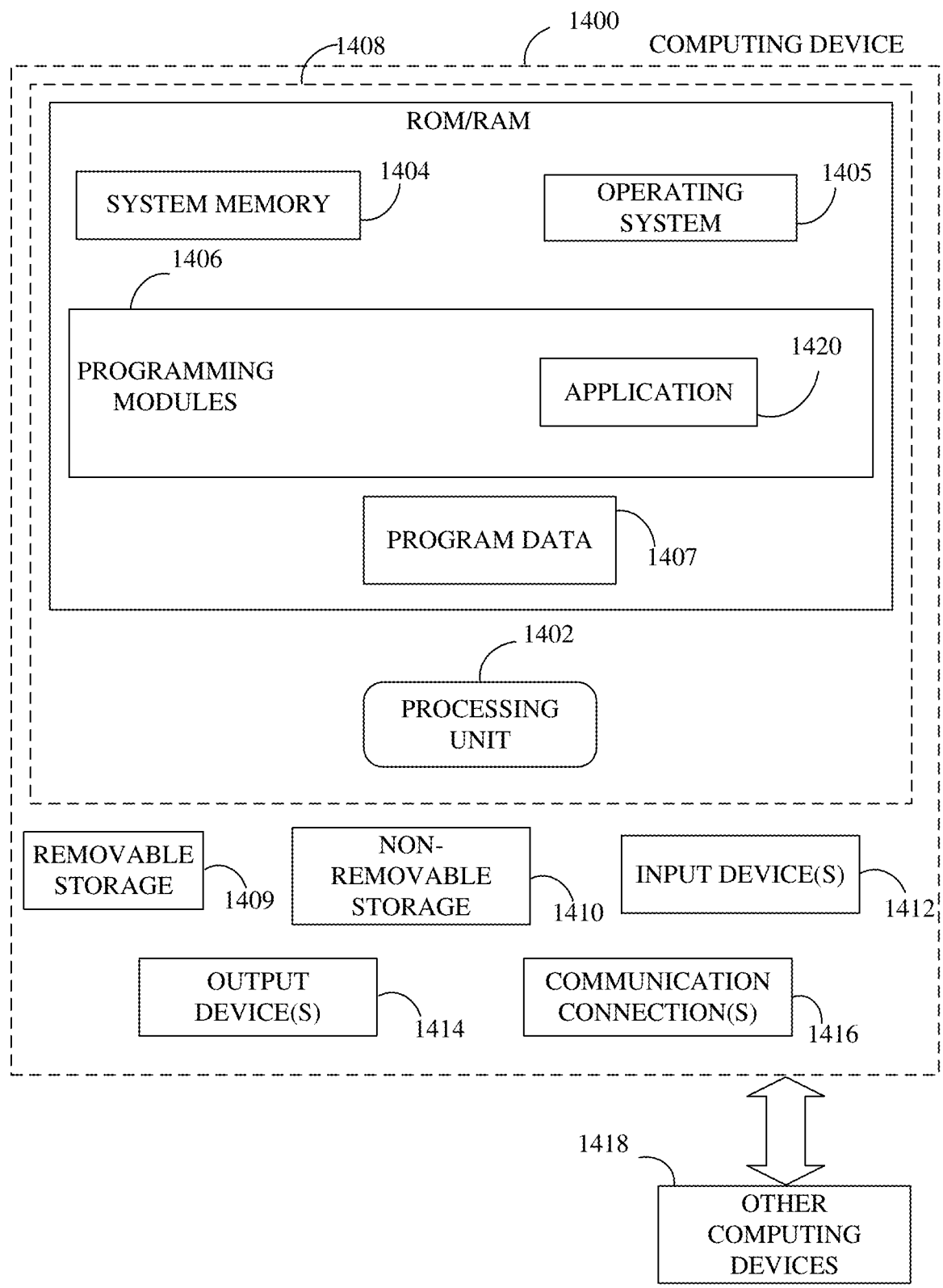
FIG. 14 is a block diagram of a computing device for implementing the methods disclosed herein, in accordance with some embodiments.

With reference to FIG. 14, a system consistent with an embodiment of the disclosure may include a computing device or cloud service, such as computing device 1400. In a basic configuration, computing device 1400 may include at least one processing unit 1402 and a system memory 1404. Depending on the configuration and type of computing device, system memory 1404 may comprise, but is not limited to, volatile (e.g. random-access memory (RAM)), non-volatile (e.g. read-only memory (ROM)), flash memory, or any combination. System memory 1404 may include operating system 1405, one or more programming modules 1406, and may include a program data 1407. Operating system 1405, for example, may be suitable for controlling computing device 1400's operation. Furthermore, embodiments of the disclosure may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410. Computer storage media may include volatile and non-volatile, removable, and non-removable media implemented in any method or technology for storage of information, such as computer-readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, a location sensor, a camera, a biometric sensor, etc. Output device(s) 1414 such as a display, speakers, a printer, etc. may also be included. The aforementioned devices are examples and others may be used.

Computing device 1400 may also contain a communication connection 1416 that may allow device 1400 to communicate with other computing devices 1418, such as over a network in a distributed computing environment, for example, an intranet or the Internet. Communication connection 1416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1404, including operating system 1405. While executing on processing unit 1402, programming modules 1406 (e.g., application 1420 such as a media player) may perform processes including, for example, one or more stages of methods, algorithms, systems, applications, servers, databases as described above. The aforementioned process is an example, and processing unit 1402 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A thermal management system for structures, the thermal management system comprising:
at least one exterior heat exchange unit configured to be disposed exterior to at least one structure;
at least one interior heat exchange unit configured to be disposed in an interior of the at least one structure, wherein the at least one structure is configured to be modularly constructed, wherein the at least one interior heat exchange unit is comprised of a plurality of tubes and a supporting structure, wherein the plurality of tubes is combined with the supporting structure, wherein the supporting structure comprises a polybutene mesh, wherein the plurality of tubes comprises micro-tubes, wherein the at least one interior heat exchange unit is a micro-tube system, wherein the micro-tube system comprises a capillary network of the plurality of tubes, wherein the at least one interior heat exchange unit further comprises at least one structural component, wherein the at least one structural component is comprised of cement mortar, wherein the capillary network of the plurality of tubes of the at least one interior heat exchange unit is incorporated with the at least one structural component, wherein the at least one structural component is configured to be disposed on at least a portion of an interior surface of the at least one structure, wherein the at least one structural component comprises at least one prefabricated building panel;
at least one flow switching device fluidly coupled with the at least one exterior heat exchange unit and the at least one interior heat exchange unit, wherein the at least one flow switching device is configured for switching a direction of flow of a working fluid between a first direction of flow and a second direction of flow, wherein the first direction of flow is opposite to the second direction of flow, wherein the working fluid flows between the at least one exterior heat exchange unit and the at least one interior heat exchange unit; and
at least one compressor unit fluidly coupled with the at least one flow switching device, wherein the at least one compressor unit is configured for circulating the working fluid between the at least one exterior heat exchange unit and the at least one interior heat exchange unit based on the direction of flow, wherein the circulating comprises drawing the working fluid in a first state and discharging the working fluid in a second state after compressing the working fluid,
wherein the working fluid in the first state is drawn from the at least one exterior heat exchange unit and the working fluid in the second state is discharged to the at least one interior heat exchange unit in the first direction of flow, wherein the at least one exterior heat exchange unit is configured for absorbing heat from the exterior of the at least one structure in the first direction of flow based on the circulating of the working fluid, wherein the at least one interior heat exchange unit is configured for discharging the heat to the interior of the at least one structure in the first direction of flow based on the circulating of the working fluid,
wherein the working fluid in the first state is drawn from the at least one interior heat exchange unit and the working fluid in the second state is discharged to the at least one exterior heat exchange unit in the second direction of flow, wherein the at least one exterior heat exchange unit is configured for discharging the heat to the exterior of the at least one structure in the second direction of flow based on the circulating of the working fluid, wherein the at least one interior heat exchange unit is configured for absorbing the heat from the interior of the at least one structure in the second direction of flow based on the circulating of the working fluid.

2. The thermal management system of claim 1, wherein the at least one exterior heat exchange unit comprises a first exterior port and a second exterior port, wherein the at least one interior heat exchange unit comprises a first interior port and a second interior port, wherein the at least one compressor unit comprises an inlet port and an outlet port, wherein the at least one flow switching device comprises a first device port, a second device port, a third device port, and a fourth device port, wherein the outlet port is fluidly coupled with the first device port using at least one first coupling element, the second device port is fluidly coupled with the first exterior port using at least one second coupling element, the second exterior port is fluidly coupled with the second interior port using at least one third coupling element, the first interior port is fluidly coupled with the fourth device port using at least one fourth coupling element, and the third device port is fluidly coupled with the inlet port using at least one fifth coupling element, wherein, when the at least one flow switching device is configured to establish the first direction of flow, the first device port is fluidly coupled with the fourth device port, and the second device port is fluidly coupled with the third device port, wherein, when the at least one flow switching device is configured to establish the second direction of flow, the first device port is fluidly coupled with the second device port, and the third device port is fluidly coupled with the fourth device port.

3. The thermal management system of claim 2, wherein the switching of the direction of flow to the first direction of flow comprises switching the at least one flow switching device such that the first device port is fluidly coupled with the fourth device port, and the second device port is fluidly coupled with the third device port.

4. The thermal management system of claim 2, wherein the switching of the direction of flow to the second direction of flow comprises switching the at least one flow switching device such that the first device port is fluidly coupled with the second device port, and the third device port is fluidly coupled with the fourth device port.

5. The thermal management system of claim 2, wherein the at least one exterior heat exchange unit comprises a plurality of tubes, wherein the plurality of tubes of the at least one exterior heat exchange unit are fluidly coupled in at least one coupling configuration defining the first exterior port and the second exterior port.

6. The thermal management system of claim 5, wherein at least one of the plurality of tubes of the at least one exterior heat exchange unit is characterized by at least one of an inner diameter and a wall thickness, wherein the inner diameter ranges from 1 millimeter (mm) to 6 millimeters (mm), wherein the wall thickness ranges from 0.5 millimeters (mm) to 2 millimeters (mm).

7. The thermal management system of claim 5, wherein at least one of the plurality of tubes of the at least one exterior heat exchange unit is coated with a coating of at least one material, wherein the at least one material comprises at least one of Polybutene, Polyethylene of Raised Temperature resistance (PERT) material, and Carbon Fiber.

8. The thermal management system of claim 7, wherein the coating of the at least one material is characterized by a coating thickness, wherein the coating thickness ranges from 0.1 millimeters (mm) to 1.5 millimeters (mm).

9. The thermal management system of claim 5, wherein the at least one exterior heat exchange unit comprises at least one fan assembly, wherein the at least one fan assembly is configured for blowing air to the plurality of tubes of the at least one exterior heat exchange unit.

10. The thermal management system of claim 9 further comprising:
at least one sensor disposed on the at least one exterior heat exchange unit, wherein the at least one sensor comprises a temperature sensor and a wind sensor, wherein the at least one sensor is configured for detecting at least one condition associated with the plurality of tubes of at the least one exterior heat exchange unit, wherein the at least one condition comprises a temperature gradient between the plurality of tubes of the at least one exterior heat exchange unit and an environment of the at least one exterior heat exchange unit, and a blowing speed of air on the plurality of tubes of the at least one exterior heat exchange unit; and
a processor communicatively coupled with the at least one sensor, wherein the processor is configured for:
generating at least one condition data associated with the at least one condition based on the detecting;
analyzing the at least one condition data;
determining at least one blowing parameter for the blowing of the air to the plurality of tubes of the at least one exterior heat exchange unit based on the analyzing, the at least one blowing parameter comprises a fan speed and a fan operation duration; and
generating at least one command for the at least one fan assembly based on the determining, wherein the at least one fan assembly is operatively coupled with the processor, wherein the blowing of the air comprises blowing the air with at least one blowing characteristic based on the at least one command, wherein the at least one blowing characteristic comprises a blowing speed and a blowing duration, wherein the at least one blowing characteristic corresponds to the at least one blowing parameter.

11. The thermal management system of claim 2, wherein the plurality of tubes of the at least one interior heat exchange unit are fluidly coupled in at least one coupling configuration defining the first interior port and the second interior port.

12. The thermal management system of claim 11, wherein at least one of the plurality of tubes of the at least one interior heat exchange unit is characterized by at least one of an inner diameter and a wall thickness, wherein the inner diameter ranges from 1 millimeter (mm) to 3 millimeters (mm), wherein the wall thickness ranges from 0.5 millimeters (mm) to 2 millimeters (mm).

13. The thermal management system of claim 11, wherein at least one of the plurality of tubes of the at least one interior heat exchange unit is comprised of carbon fiber, wherein at least one of the plurality of tubes of the at least one interior heat exchange unit is coated with a coating of at least one material, wherein the at least one material comprises Polyethylene of Raised Temperature resistance (PERT) material.

14. The thermal management system of claim 13, wherein the coating of the at least one material is characterized by a coating thickness, wherein the coating thickness ranges from 0.1 millimeters (mm) to 1.5 millimeters (mm).

15. The thermal management system of claim 1, wherein the working fluid comprises carbon dioxide.

16. A thermal management system for structures, the thermal management system comprising:
at least one exterior heat exchange unit configured to be disposed exterior to at least one structure;
at least one interior heat exchange unit configured to be disposed in an interior of the at least one structure, wherein the at least one structure is configured to be modularly constructed, wherein the at least one interior heat exchange unit is comprised of a plurality of tubes and a supporting structure, wherein the plurality of tubes is combined with the supporting structure, wherein the supporting structure comprises a polybutene mesh, wherein the plurality of tubes comprises micro-tubes, wherein the at least one interior heat exchange unit is a micro-tube system, wherein the micro-tube system comprises a capillary network of the plurality of tubes, wherein the at least one interior heat exchange unit further comprises at least one structural component, wherein the at least one structural component is comprised of cement mortar, wherein the capillary network of the plurality of tubes of the at least one interior heat exchange unit is incorporated with the at least one structural component, wherein the at least one structural component is configured to be disposed on at least a portion of an interior surface of the at least one structure, wherein the at least one structural component comprises at least one prefabricated building panel;

at least one flow switching device fluidly coupled with the at least one exterior heat exchange unit and the at least one interior heat exchange unit, wherein the at least one flow switching device is configured for switching a direction of flow of a working fluid between a first direction of flow and a second direction of flow, wherein the first direction of flow is opposite to the second direction of flow, wherein the working fluid flows between the at least one exterior heat exchange unit and the at least one interior heat exchange unit; and at least one compressor unit fluidly coupled with the at least one flow switching device, wherein the at least one compressor unit is configured for circulating the working fluid between the at least one exterior heat exchange unit and the at least one interior heat exchange unit based on the direction of flow, wherein the circulating comprises drawing the working fluid in a first state and discharging the working fluid in a second state after compressing the working fluid, wherein the working fluid in the first state is drawn from the at least one exterior heat exchange unit and the working fluid in the second state is discharged to the at least one interior heat exchange unit in the first direction of flow, wherein the at least one exterior heat exchange unit is configured for absorbing heat from the exterior of the at least one structure in the first direction of flow based on the circulating of the working fluid, wherein the at least one interior heat exchange unit is configured for discharging the heat to the interior of the at least one structure in the first direction of flow based on the circulating of the working fluid, wherein the working fluid in the first state is drawn from the at least one interior heat exchange unit and the working fluid in the second state is discharged to the at least one exterior heat exchange unit in the second direction of flow, wherein the at least one exterior heat exchange unit is configured for discharging the heat to the exterior of the at least one structure in the second direction of flow based on the circulating of the working fluid, wherein the at least one interior heat exchange unit is configured for absorbing the heat from the interior of the at least one structure in the second direction of flow based on the circulating of the working fluid, wherein the at least one exterior heat exchange unit comprises a first exterior port and a second exterior port, wherein the at least one interior heat exchange unit comprises a first interior port and a second interior port, wherein the at least one compressor unit comprises an inlet port and an outlet port, wherein the at least one flow switching device comprises a first device port, a second device port, a third device port, and a fourth device port, wherein the outlet port is fluidly coupled with the first device port using at least one first coupling element, the second device port is fluidly coupled with the first exterior port using at least one second coupling element, the second exterior port is fluidly coupled with the second interior port using at least one third coupling element, the first interior port is fluidly coupled with the fourth device port using at least one fourth coupling element, and the third device port is fluidly coupled with the inlet port using at least one fifth coupling element, wherein, when the at least one flow switching device is configured to establish the first direction of flow, the first device port is fluidly coupled with the fourth device port, and the second device port is fluidly coupled with the third device port, wherein, when the at least one flow switching device is configured to establish the second direction of flow, the first device port is fluidly coupled with the second device port, and the third device port is fluidly coupled with the fourth device port, wherein the at least one exterior heat exchange unit comprises a plurality of tubes, wherein the plurality of tubes of the at least one exterior heat exchange unit are fluidly coupled in at least one coupling configuration defining the first exterior port and the second exterior port, wherein the plurality of tubes of the at least one interior heat exchange unit are fluidly coupled in at least one coupling configuration defining the first interior port and the second interior port.

17. A thermal management system for structures, the thermal management system comprising:

at least one exterior heat exchange unit configured to be disposed exterior to at least one structure;

at least one interior heat exchange unit configured to be disposed in an interior of the at least one structure, wherein the at least one structure is configured to be modularly constructed, wherein the at least one interior heat exchange unit is comprised of a plurality of tubes and a supporting structure, wherein the plurality of tubes is combined with the supporting structure, wherein the supporting structure comprises a polybutene mesh, wherein the plurality of tubes comprises micro-tubes, wherein the at least one interior heat exchange unit is a micro-tube system, wherein the micro-tube system comprises a capillary network of the plurality of tubes, wherein the at least one interior heat exchange unit further comprises at least one structural component, wherein the at least one structural component is comprised of cement mortar, wherein the capillary network of the plurality of tubes of the at least one interior heat exchange unit is incorporated with the at least one structural component, wherein the at least one structural component is configured to be disposed on at least a portion of an interior surface of the at least one structure, wherein the at least one structural component comprises at least one prefabricated building panel;

at least one flow switching device fluidly coupled with the at least one exterior heat exchange unit and the at least one interior heat exchange unit, wherein the at least one flow switching device is configured for switching a direction of flow of a working fluid between a first direction of flow and a second direction of flow, wherein the first direction of flow is opposite to the second direction of flow, wherein the working fluid flows between the at least one exterior heat exchange unit and the at least one interior heat exchange unit; and at least one compressor unit fluidly coupled with the at least one flow switching device, wherein the at least one compressor unit is configured for circulating the working fluid between the at least one exterior heat exchange unit and the at least one interior heat exchange unit based on the direction of flow, wherein the circulating comprises drawing the working fluid in a first state and discharging the working fluid in a second state after compressing the working fluid, wherein the working fluid in the first state is drawn from the at least one exterior heat exchange unit and the working fluid in the second state is discharged to the at least one interior heat exchange unit in the first direction of flow, wherein the at least one exterior heat exchange unit is configured for absorbing heat from the exterior of the at least one structure in the first direction of flow based on the circulating of the working fluid, wherein the at least one interior heat exchange unit is configured for discharging the heat to the interior of the at least one structure in the first direction of flow based on the circulating of the working fluid, wherein the working fluid in the first state is drawn from the at least one interior heat exchange unit and the working fluid in the second state is discharged to the at least one exterior heat exchange unit in the second direction of flow, wherein the at least one exterior heat exchange unit is configured for discharging the heat to the exterior of the at least one structure in the second direction of flow based on the circulating of the working fluid, wherein the at least one interior heat exchange unit is configured for absorbing the heat from the interior of the at least one structure in the second direction of flow based on the circulating of the working fluid, wherein the at least one exterior heat exchange unit comprises a first exterior port and a second exterior port, wherein the at least one interior heat exchange unit comprises a first interior port and a second interior port, wherein the at least one compressor unit comprises an inlet port and an outlet port, wherein the at least one flow switching device comprises a first device port, a second device port, a third device port, and a fourth device port, wherein the outlet port is fluidly coupled with the first device port using at least one first coupling element, the second device port is fluidly coupled with the first exterior port using at least one second coupling element, the second exterior port is fluidly coupled with the second interior port using at least one third coupling element, the first interior port is fluidly coupled with the fourth device port using at least one fourth coupling element, and the third device port is fluidly coupled with the inlet port using at least one fifth coupling element, wherein, when the at least one flow switching device is configured to establish the first direction of flow, the first device port is fluidly coupled with the fourth device port, and the second device port is fluidly coupled with the third device port, wherein, when the at least one flow switching device is configured to establish the second direction of flow, the first device port is fluidly coupled with the second device port, and the third device port is fluidly coupled with the fourth device port.

\* \* \* \* \*